United States Patent
Yoshida et al.

(10) Patent No.: US 8,579,071 B2
(45) Date of Patent: Nov. 12, 2013

(54) POWER STEERING SYSTEM AND METHOD FOR ASSEMBLING THE POWER STEERING SYSTEM

(75) Inventors: Osamu Yoshida, Yokohama (JP); Tatsuyoshi Maruyama, Atsugi (JP); Kiyotaka Shirakubo, Ayase (JP); Naoki Takayanagi, Kawasaki (JP)

(73) Assignee: Hitachi Automotive Systems Steering, Ltd., Hiki-gun (JP)

( * ) Notice: Subject to any disclaimer, the term of this patent is extended or adjusted under 35 U.S.C. 154(b) by 0 days.

(21) Appl. No.: 13/456,572

(22) Filed: Apr. 26, 2012

(65) Prior Publication Data
US 2012/0273294 A1 Nov. 1, 2012

(30) Foreign Application Priority Data
Apr. 27, 2011 (JP) ................................. 2011-099637

(51) Int. Cl.
*B62D 5/04* (2006.01)
(52) U.S. Cl.
USPC .......................................... 180/444; 180/443
(58) Field of Classification Search
USPC .......................................... 180/443, 444, 446
See application file for complete search history.

(56) References Cited

U.S. PATENT DOCUMENTS

| | | | | |
|---|---|---|---|---|
| 6,595,074 B2 * | 7/2003 | Shimizu et al. | .......... | 73/862.333 |
| 6,868,936 B2 * | 3/2005 | Shimizu et al. | ............... | 180/444 |
| 7,284,635 B2 * | 10/2007 | Chikaraishi | .................... | 180/444 |
| 2009/0250287 A1 * | 10/2009 | Takashima et al. | ........... | 180/444 |

FOREIGN PATENT DOCUMENTS

JP 2009-298246 A 12/2009

* cited by examiner

*Primary Examiner* — Kevin Hurley
*Assistant Examiner* — Marc A Scharich
(74) *Attorney, Agent, or Firm* — Foley & Lardner LLP

(57) ABSTRACT

A power steering system having a housing having first and second housing sections, a steering shaft rotatably housed in the housing, a sensor coil, a coil bobbin having a coil holding part and a flange part and housed in the first housing section, a first held section provided at the flange part, a sensor board housed in the housing, a second held section provided at the sensor board, first and second riveting portions provided at the first housing section, and an electric motor. The first riveting portion fixes the coil bobbin to the first housing section by melting and deforming the first riveting portion with the first held section touching the first riveting portion. The second riveting portion fixes the sensor board to the first housing section by melting and deforming the second riveting portion with the second held section touching the second riveting portion.

20 Claims, 12 Drawing Sheets

POWER STEERING SYSTEM AND METHOD FOR ASSEMBLING THE POWER STEERING SYSTEM

BACKGROUND OF THE INVENTION

The present invention relates to a power steering system that provides a steering assist force to steered road wheels of a vehicle.

In recent years, there have been proposed and developed various power steering systems whose housing is formed by resin material. One such power steering system has been disclosed, for instance, in Japanese Patent Provisional Publication No. 2009-298246 (hereinafter is referred to as "JP2009-298246").

SUMMARY OF THE INVENTION

In a case of the power steering system in JP2009-298246, however, location or layout of each of parts and its assembling manner are not sufficiently taken into account, and an effect of improving vehicle-mount layout, which is one of advantages by the fact that the housing is formed by the resin material, is not fully produced.

It is therefore an object of the present invention to provide a power steering system which is capable of improving the vehicle-mount layout.

According to one aspect of the present invention, a power steering system comprises: a housing having a first housing section which is formed by resin material and has a coil housing portion thereinside and an opening portion at an axial direction side thereof and a second housing section which closes the opening portion of the first housing section by being combined with the first housing section; a steering shaft having an input shaft to which a turning force from a steering wheel is transmitted and an output shaft which is connected to the input shaft through a torsion bar and transmits the turning force to steered road wheels, the steering shaft rotatably housed in the housing; a sensor coil housed in the coil housing portion and positioned at an outer periphery of the steering shaft, the sensor coil outputting a relative rotation amount between the input shaft and the output shaft as an impedance change by application of an excitation signal; a coil bobbin having a coil holding part which holds the sensor coil and a flange part which is provided so as to protrude from the coil holding part in a radially outward direction, the coil bobbin formed by the resin material and housed in the coil housing portion; a first held section provided at the flange part of the coil bobbin; a sensor board housed in the housing and electrically connected to the sensor coil, an electronic element that outputs the excitation signal to the sensor coil being mounted on the sensor board; a second held section provided at the sensor board; a first riveting portion formed by the resin material and provided at the first housing section, the first riveting portion fixing the coil bobbin to the first housing section by the fact that a first holding section that engages with and holds the first held section is formed at the first riveting portion in a molten state; a second riveting portion formed by the resin material and provided at the first housing section, the second riveting portion fixing the sensor board to the first housing section by the fact that a second holding section that engages with and holds the second held section is formed at the second riveting portion in the molten state; and an electric motor driven and controlled according to an output signal of the sensor coil and providing a steering assist force to the steered road wheels, and one of the flange part of the coil bobbin and the sensor board is located at a second housing section side with respect to the other in an axial direction of the steering shaft, and one of the first and second riveting portions, which is provided at the other of the flange part and the sensor board, is disposed so as to overlap the one of the flange part and the sensor board in a direction orthogonal to the steering shaft.

According to another aspect of the present invention, a power steering system comprises: a housing having a first housing section which is formed by resin material and has a coil housing portion thereinside and an opening portion at an axial direction side thereof and a second housing section which closes the opening portion of the first housing section by being combined with the first housing section; a steering shaft having an input shaft to which a turning force from a steering wheel is transmitted and an output shaft which is connected to the input shaft through a torsion bar and transmits the turning force to steered road wheels, the steering shaft rotatably housed in the housing; a sensor coil housed in the coil housing portion and positioned at an outer periphery of the steering shaft, the sensor coil outputting a relative rotation amount between the input shaft and the output shaft as an impedance change by application of an excitation signal; a coil bobbin having a coil holding part which holds the sensor coil and a plurality of flange parts which are arranged at a certain distance in a circumferential direction so as to protrude from the coil holding part in a radially outward direction, the coil bobbin formed by the resin material and housed in the coil housing portion; a first held section provided at each of the flange parts of the coil bobbin; a sensor board housed in the housing and electrically connected to the sensor coil, an electronic element that outputs the excitation signal to the sensor coil being mounted on the sensor board; a bobbin penetration hole which is a penetration hole provided at the sensor board and is formed so that the coil holding part and a plurality of the flange parts of the coil bobbin can be inserted, the bobbin penetration hole having a plurality of large diameter parts which are formed so that a plurality of the flange parts of the coil bobbin can be inserted; and a small diameter part which is provided between the adjacent two large diameter parts and is located so that an outer edge of the small diameter part is positioned at a radially inward direction side with respect to the first held section; a second held section provided at the sensor board; a first riveting portion formed by the resin material and provided at the first housing section, the first riveting portion fixing the coil bobbin to the first housing section by the fact that a first holding section that engages with and holds the first held section is formed at the first riveting portion in a molten state; a second riveting portion formed by the resin material and provided at the first housing section, the second riveting portion fixing the sensor board to the first housing section by the fact that a second holding section that engages with and holds the second held section is formed at the second riveting portion in the molten state; and an electric motor driven and controlled according to an output signal of the sensor coil and providing a steering assist force to the steered road wheels.

According to a further aspect of the invention, a method for assembling a power steering system, the power steering system having: a housing having a first housing section which is formed by resin material and has a coil housing portion thereinside and an opening portion at an axial direction side thereof and a second housing section which closes the opening portion of the first housing section by being combined with the first housing section; a steering shaft having an input shaft to which a turning force from a steering wheel is transmitted and an output shaft which is connected to the input shaft through a torsion bar and transmits the turning force to steered road wheels, the steering shaft rotatably housed in the housing; a sensor coil housed in the coil housing portion and positioned at an outer periphery of the steering shaft, the sensor coil outputting a relative rotation amount between the input shaft and the output shaft as an impedance change by application of an excitation signal; a coil bobbin having a coil holding part which holds the sensor coil and a flange part which is provided so as to protrude from the coil holding part in a radially outward direction, the coil bobbin formed by the resin material and housed in the coil housing portion; first and second riveting portions formed by the resin material and provided at the first housing section; a first held section provided at the flange part of the coil bobbin; a sensor board housed in the housing and electrically connected to the sensor coil, an electronic element that outputs the excitation signal to the sensor coil being mounted on the sensor board; a second held section provided at the sensor board; and an electric motor driven and controlled according to an output signal of the sensor coil and providing a steering assist force to the steered road wheels, the method comprises: a bobbin inserting process that inserts the coil bobbin in the coil housing portion; a first riveting process that fixes the coil bobbin to the first housing section by deforming the first riveting portion after melting the first riveting portion with the first held section being contiguous with the first riveting portion; a board setting process that sets the sensor board at a second housing section side with respect to the flange part so that the second held section is contiguous with the second riveting portion, after the first riveting process; and a second riveting process that fixes the sensor board to the first housing section by deforming the second riveting portion after melting the second riveting portion with the second held section being contiguous with the second riveting portion.

The other objects and features of this invention will become understood from the following description with reference to the accompanying drawings.

DETAILED DESCRIPTION OF THE INVENTION

Embodiments of a power steering system of the present invention will be explained below with reference to the drawings.

Embodiment 1

A steering system (a steering mechanism) of a vehicle, provided with a power steering system 1 (hereinafter, also simply called a system 1) of an embodiment 1, has a steering operation mechanism having a steering wheel and a steering shaft 2 connected to the steering wheel, a gear mechanism connected to the steering shaft 2, and a link mechanism transmitting power from the gear mechanism to steered road wheels (e.g. front right and left wheels).

The gear mechanism is a so-called rack-and-pinion mechanism in which a pinion gear is engaged with a rack, and has a pinion shaft and a rack shaft. The steered road wheels are connected to both axial ends of the rack shaft through the link mechanism. When a driver turns the steering wheel to steer the vehicle, the pinion shaft is driven and rotates through the steering shaft 2, and the rack shaft moves in the axial direction thereof by means of the gear mechanism, thereby steering or turning the steered road wheels.

Figure 1:
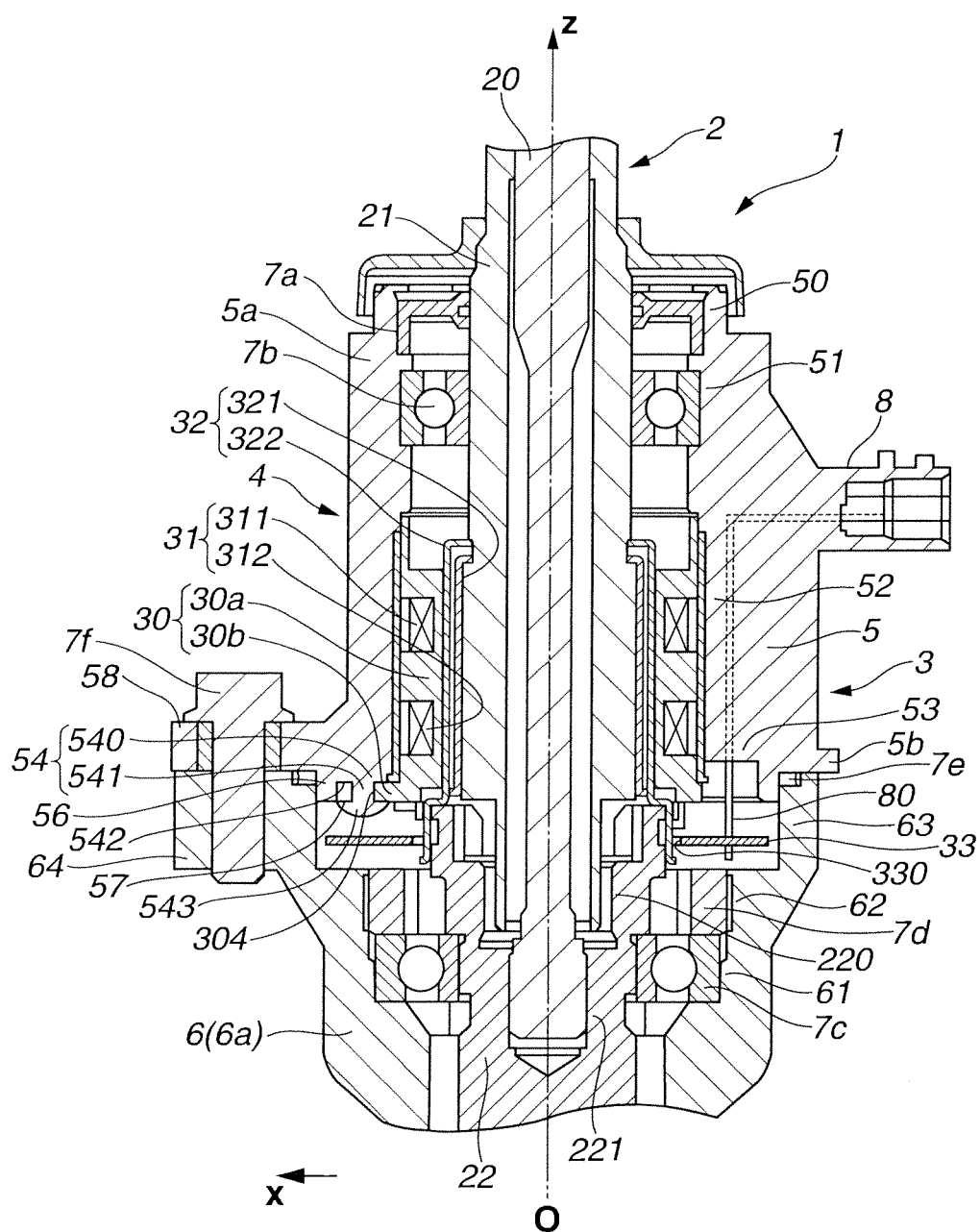
FIG. 1 is a local sectional view of a power steering system, cut in a direction of a steering shaft, of an embodiment 1 of the present invention.

FIG. 1 is a local sectional view of the power steering system 1, longitudinally cut along a center axis O of the steering shaft 2, around a torque sensor 3. For the sake of explanation, a Z-axis is set on the center axis O, and a side of the steering wheel is defined as a positive direction of the Z-axis.

Figure 2:
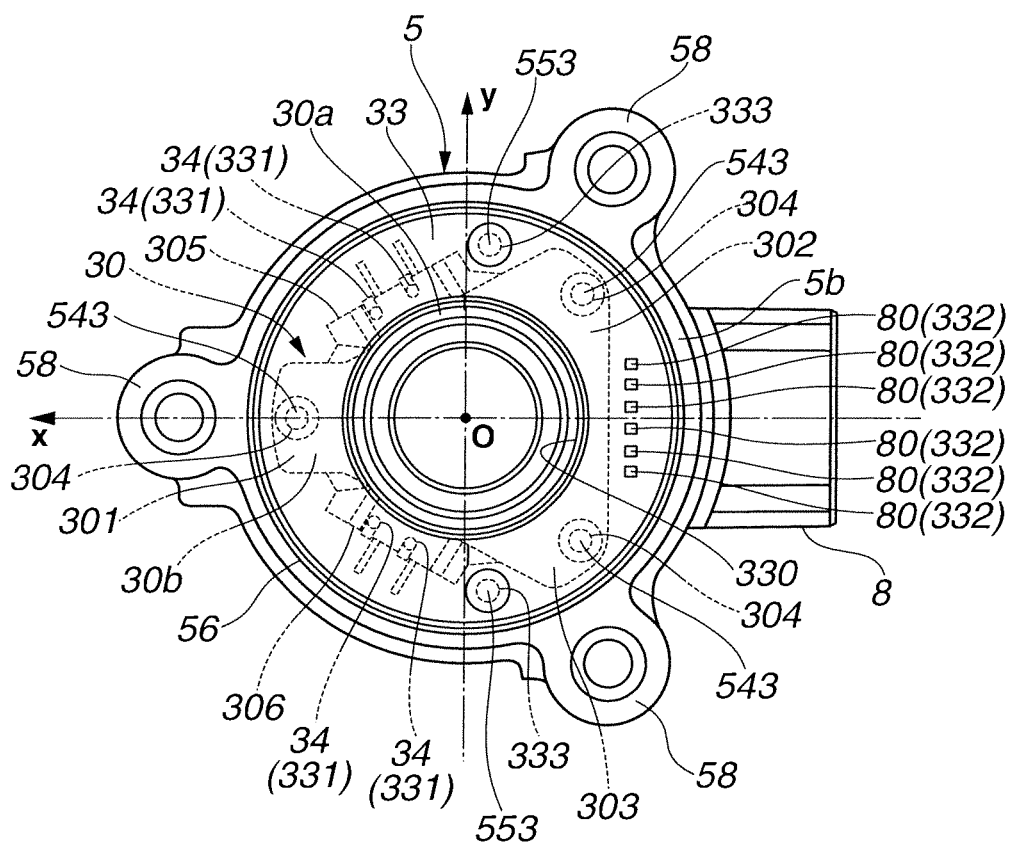
FIG. 2 is a bottom view of the power steering system, when viewing a unit of a sensor housing side from the steering shaft direction.

FIG. 2 is a bottom view of the power steering system 1 with the steering shaft 2 and a gear housing 6 removed, viewed from a Z-axis negative direction. For the sake of explanation, an X-axis, which extends in right and left directions in FIG. 1 on a plane that is orthogonal to the Z-axis and crosses the center axis O, is set. A side opposite to a connecter 8 with respect to the center axis O (i.e. a left hand side with respect to the center axis O in FIG. 1) is defined as an X-axis positive direction. Further, a Y-axis, which is orthogonal to the Z-axis and the X-axis and crosses the center axis O, is set. An upper side with respect to the center axis O in FIG. 2 is defined as a Y-axis positive direction.

In FIG. 2, a coil bobbin 30 located at a back side (at the Z-axis positive direction side) of a sensor board 33 is illustrated by a broken line.

FIGS. 3A and 3B to 5A and 5B show each state of assembly of a unit of a sensor housing 5 side that forms a housing 4.

Figure 3A:
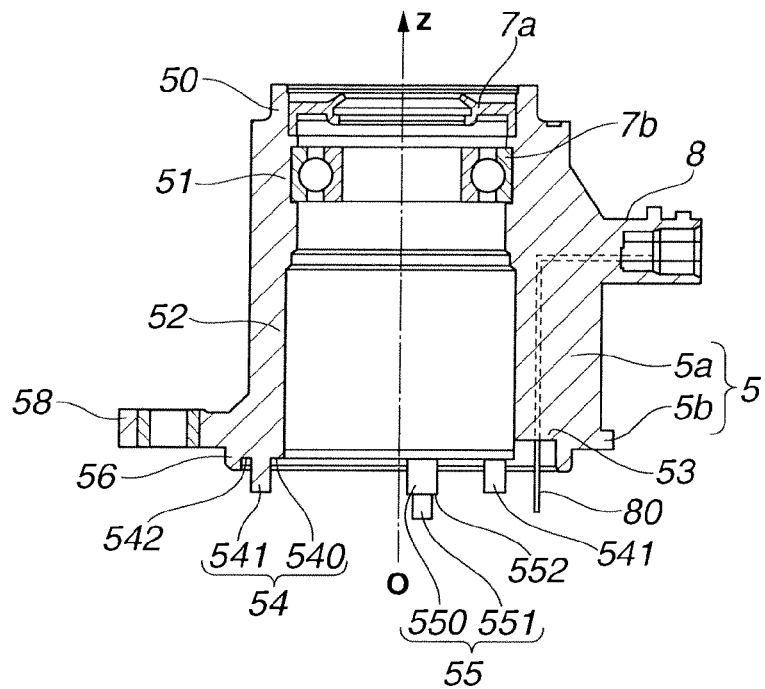
FIG. 3A is a sectional view of the sensor housing, cut in the steering shaft direction.
Figure 3B:
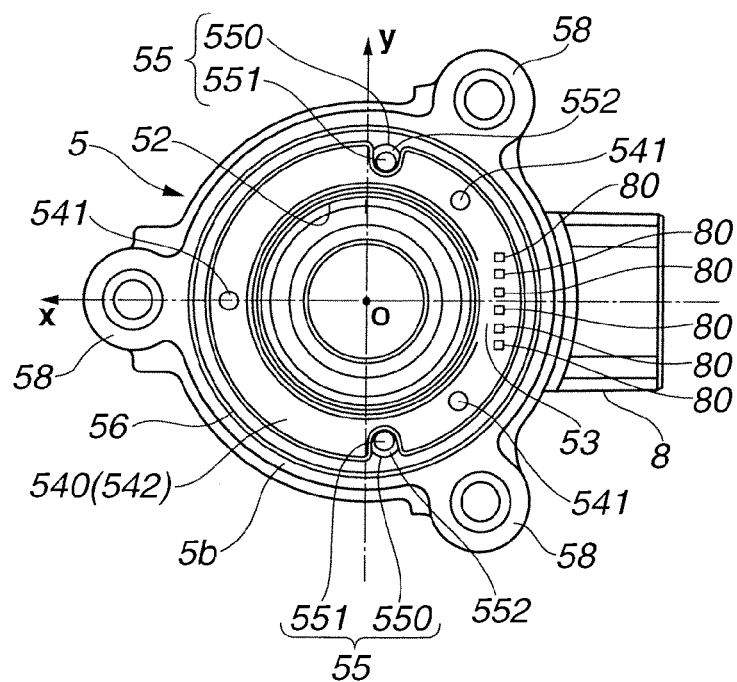
FIG. 3B is a bottom view of the sensor housing, viewed from the steering shaft direction.
Figure 4A:
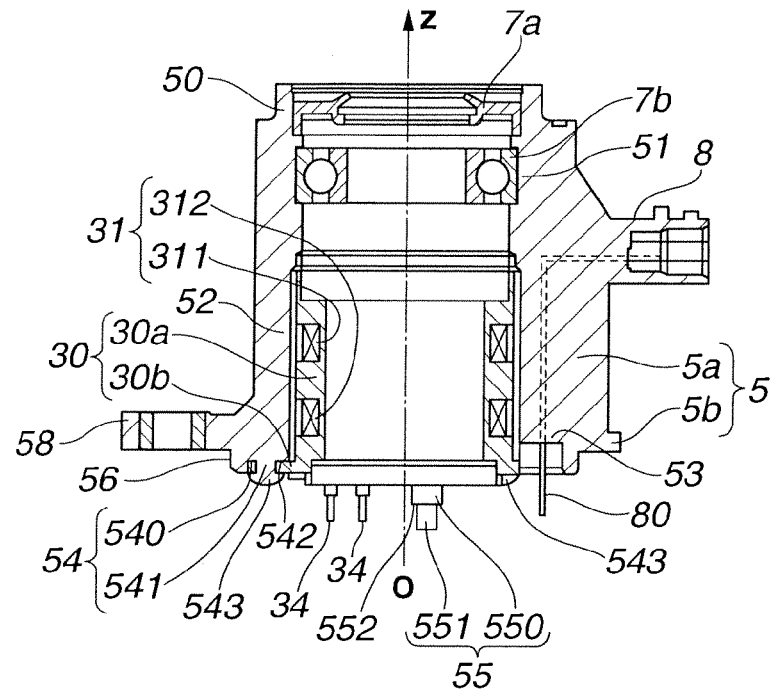
FIG. 4A is a sectional view of the sensor housing with a coil bobbin installed and fixed in the sensor housing, cut in the steering shaft direction.
Figure 4B:
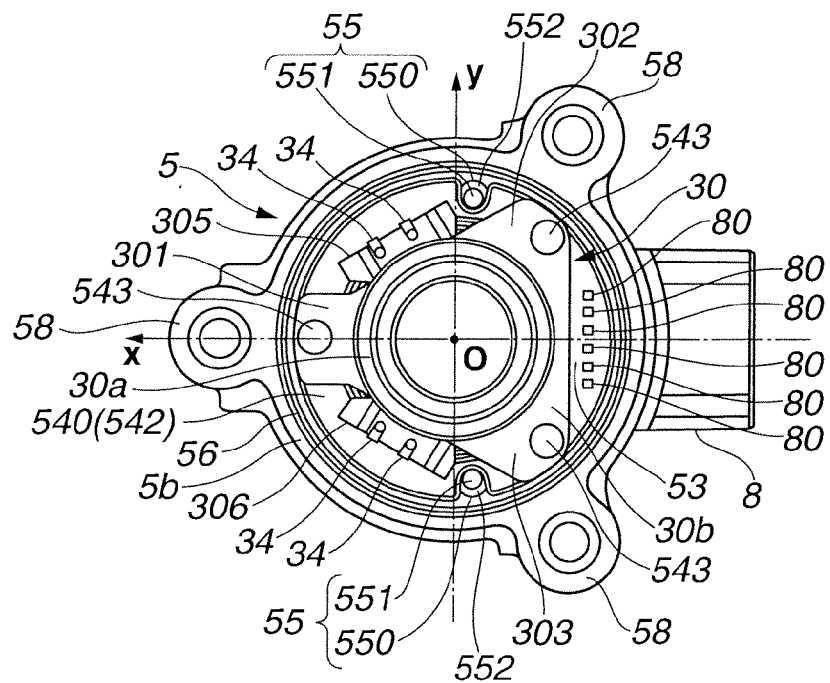
FIG. 4B is a bottom view of the sensor housing and the coil bobbin, viewed from the steering shaft direction.
Figure 5A:
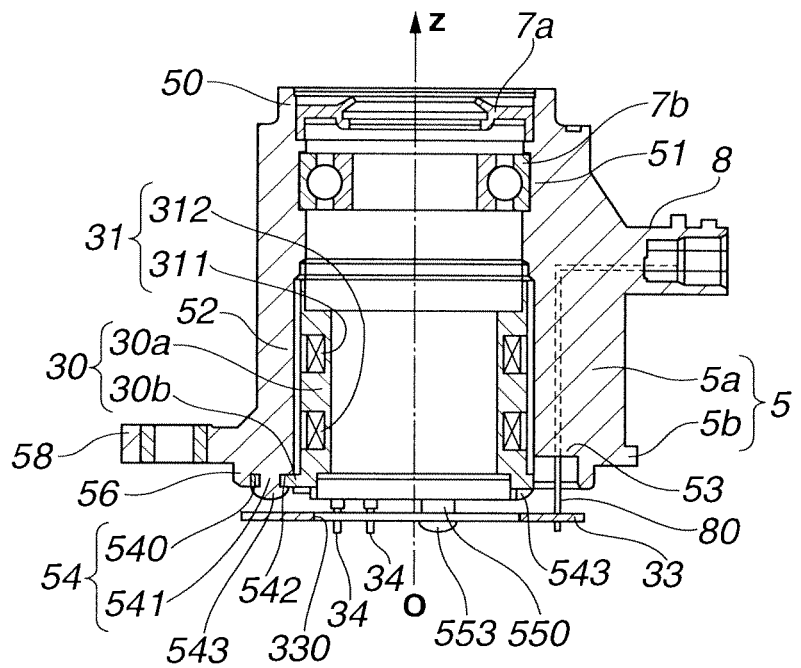
FIG. 5A is a sectional view of the sensor housing with the coil bobbin installed and fixed in the sensor housing and with a sensor board set and fixed to the sensor housing, cut in the steering shaft direction.
Figure 5B:
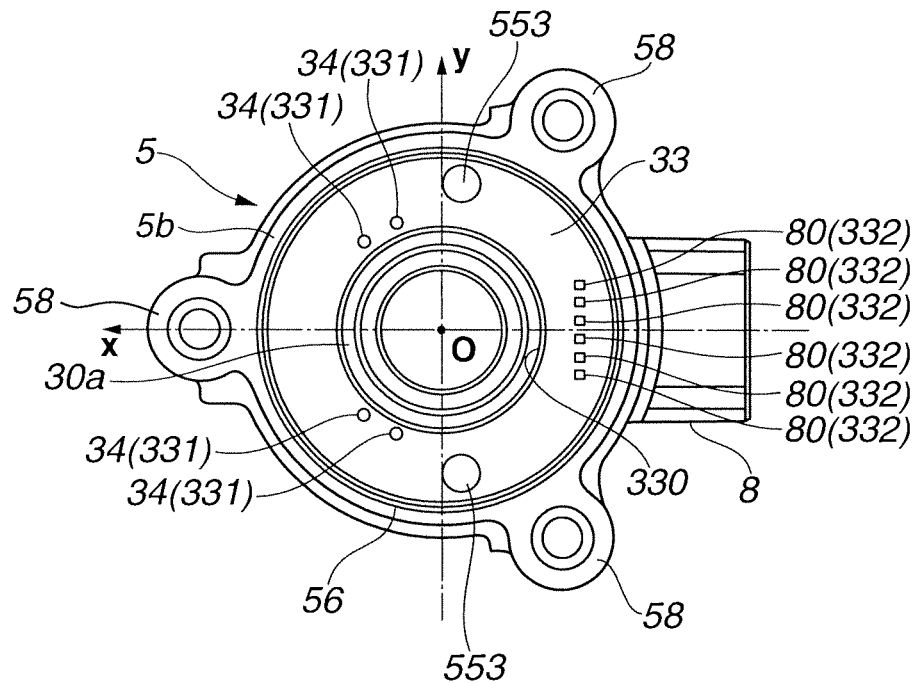
FIG. 5B is a bottom view of the sensor housing, the coil bobbin and the sensor board, viewed from the steering shaft direction.

FIGS. 3A and 3B show a state in which a ball bearing 7b, a seal member 7a, etc. are installed in the sensor housing 5. FIGS. 4A and 4B show a state in which the coil bobbin 30 is further set in the sensor housing 5. FIGS. 5A and 5B show a state in which the sensor board 33 is further set.

Here, FIGS. 3A, 4A and 5A are cross sections of the unit, longitudinally cut as same as FIG. 1. FIGS. 3B, 4B and 5B are bottom views of the unit, viewed from the Z-axis negative direction.

The power steering system 1 is a so-called electric motor direct-connected power steering system that generates a steering assist force by the fact that an electric motor directly drives the gear. The power steering system 1 has the steering shaft 2, the torque sensor 3 and the electric motor. As shown in FIG. 1, each component of the system 1 is housed in the housing 4.

The housing 4 has the sensor housing 5 as a first housing section, the gear housing 6 as a second housing section, a motor housing and an ECU housing. The sensor housing 5 houses therein the torque sensor 3 that detects a steering state. The gear housing 6 houses therein the gear mechanism. The motor housing houses therein the electric motor that is an actuator providing the steering assist force to the steered road wheels. The ECU housing houses therein a motor control unit (hereinafter called an ECU) that is a controller controlling drive of the electric motor on the basis of an output signal of the torque sensor 3. The sensor housing 5 and the gear housing 6 are combined together, then form a single unit. The motor housing is also combined integrally with the gear housing 6. Further, the ECU housing could be formed integrally with the motor housing, as a so-called electrical mechanical integrated unit.

The steering shaft 2 has an input shaft 21 and an output shaft 22, and is rotatably housed in the housing 4. The input shaft 21 is housed in the sensor housing 5, and a turning force from the steering wheel is transmitted to the input shaft 21. The input shaft 21 has a tubular shape, and a Z-axis positive direction end portion of a torsion bar 20 is secured to an inner periphery, at the Z-axis positive direction side, of the input shaft 21. A Z-axis negative direction end portion of the input shaft 21 is rotatably housed in a recessed part 220 of the output shaft 22 which is formed at a Z-axis positive direction end portion of the output shaft 22.

A Z-axis negative direction end portion of the torsion bar 20 is fixed to a fitting hole 221 of the output shaft 22 which is formed at a bottom of the recessed part 220.

The output shaft 22 is linked with the input shaft 21 through the torsion bar 20. The output shaft 22 is housed in the gear housing 6 (a gear housing part 6a), and a turning force from the input shaft 21 is transmitted to the output shaft 22. The output shaft 22 is provided with the pinion, and forms the pinion shaft. The output shaft 22 transmits the turning force to the steered road wheels through the gear mechanism.

The torque sensor 3 detects a rotation state (a rotation amount) of the steering shaft 2, and outputs it to the ECU. More specifically, the torque sensor 3 detects a relative rotation amount between the input shaft 21 and the output shaft 22 (i.e. a torsion amount of the torsion bar 20) as a steering torque generated at the steering shaft 2 by driver's steering operation.

The electric motor is an electrically powered motor that is driven by power supplied from a power source (a battery) that is mounted in the vehicle. As the electric motor, for instance, a three-phase brushless DC motor can be used. The electric motor provides an assist power to a rotation of the output shaft 22 (the pinion shaft) through a speed reduction gear mechanism (e.g. a worm gear), then provides the steering assist force to the steered road wheels. The electric motor is provided with a rotation angle sensor such as a resolver to detect an rotation angle or a rotational position of an output shaft of the electric motor.

The ECU is an electronic control unit that is connected to each sensor such as the electric motor, the torque sensor 3 and the rotation angle sensor, and also is a motor control device (the motor control unit) that controls the drive of the electric motor on the basis of a detection signal (the steering torque) outputted from the torque sensor 3 (a sensor coil 31).

When the steering wheel is turned by the driver's steering operation, the steering torque inputted to the output shaft 22 through the input shaft 21 is detected by the torque sensor 3. The detected steering torque signal is outputted to the ECU. The ECU calculates a target steering assist force on the basis of information such as the inputted steering torque. Further, the ECU outputs a drive signal to the electric motor according to this target steering assist force and signals such as the inputted motor rotational position signal, then controls the electric motor. The ECU controls current that flows in the electric motor, thereby providing a proper assist power to the rotation of the output shaft 22 (the pinion shaft). Driver's steering effort is then assisted (reduced).

The torque sensor 3 is a so-called magnetostriction torque sensor. The torque sensor 3 has the coil bobbin 30, the sensor coil 31, a variable magnetic path-resistance member 32 and the sensor board 33, and is connected to the ECU. The coil bobbin 30 is an insulative coil holding member formed by resin material, and is housed/installed in the sensor housing 5 (a coil housing portion 52). The coil bobbin 30 has a cylindrical coil holding part 30a that holds the sensor coil 31 and a flange part 30b that is formed at one side, in the axial direction, of the coil holding part 30a (i.e. at a Z-axis negative direction side opening of the coil bobbin 30) and protrudes in a radially outward direction (in a direction orthogonal to the steering shaft 2 and moving away from the center axis O).

As shown in FIG. 2, the flange part 30b has a first flange part 301 at the X-axis positive direction side, and second and third flange parts 302, 303 at an X-axis negative direction side. The first flange part 301 is formed into a substantially rectangular shape, viewed from the Z-axis negative direction side, which is placed in the substantially same Y-axis direction position as the center axis O and extends in the X-axis positive direction. The second and third flange parts 302, 303 are provided at both Y-axis positive and negative direction sides, and formed into such substantially trapezoidal shape that a circumferential size of the coil bobbin 30 (a size of periaxial direction of the coil bobbin 30) becomes smaller toward the radially outward direction. One side, at the X-axis negative direction side, of the second flange part 302 and one side, at the X-axis negative direction side, of the third flange part 303 are seamlessly joined as one seamless side or surface that runs substantially parallel to the Y-axis.

The first to third flange parts 301 to 303 are each provided, at an outer circumferential side thereof, with a hole (an axial direction penetration hole) 304 that penetrates the coil bobbin 30 in the axial direction (in the Z-axis direction).

Each axial direction penetration hole 304 of the first to third flange parts 301 to 303 and its surrounding part form a first held section.

First and second terminal setting parts 305, 306 are provided at the axial direction one side of the coil holding part 30a (i.e. at the Z-axis negative direction side opening of the coil bobbin 30). The first terminal setting part 305 is located between the first flange part 301 and the second flange part 302. The second terminal setting part 306 is located between the first flange part 301 and the third flange part 303. The first and second terminal setting parts 305, 306 protrude in the radially outward direction from an outer periphery of the coil holding part 30a. A plurality of coil terminals 34 (two coil terminals 34) are set at each of the first and second terminal setting parts 305, 306.

The coil terminal 34 extends from each of the first and second terminal setting parts 305, 306 in the Z-axis negative direction, and protrudes from the flange part 30b in the Z-axis negative direction. On the other hand, the coil terminal 34 extends in the Z-axis positive direction from the each of the first and second terminal setting parts 305, 306 inside the coil holding part 30a, and is connected to the sensor coil 31.

The sensor coil 31 has two coil units 311, 312 that are held by the coil bobbin 30, and generates magnetic flux by current application. The sensor coil 31 (the coil bobbin 30) is housed/installed in the coil housing portion 52 of the sensor housing 5 so as to surround or encircle an outer periphery of the input shaft 21.

The input shaft 21 is formed by magnetic material, and forms magnetic field by the magnetic flux generated by the sensor coil 31.

As shown in FIG. 1, the variable magnetic path-resistance member 32 has an inner ring 321 and an outer ring 322. Each of the inner ring 321 and the outer ring 322 is a cylindrical member having a plurality of windows (opening portions) that extend in the Z-axis direction. These inner and outer rings 321, 322 are formed by conductive and non-magnetic material such as aluminum. The inner ring 321 is secured to and retained by the outer periphery of the input shaft 21, and rotates integrally with the input shaft 21. The outer ring 322 is secured to and retained by the Z-axis positive direction end portion of the output shaft 22, and rotates integrally with the output shaft 22. The outer ring 322 is disposed between the input shaft 21 and the sensor coil 31 (the coil bobbin 30). An outer peripheral surface of the outer ring 322 faces to an inner peripheral surface of the sensor coil 31, and an inner peripheral surface of the outer ring 322 faces to an outer peripheral surface of the inner ring 321.

An overlap area of the windows between the inner and outer rings 321, 322 changes according to a change of the relative rotation amount between the input shaft 21 and the output shaft 22, and thus magnetic path resistance of the magnetic field generated by the sensor coil 31 varies.

The sensor board 33 is a disc board having, at a center (at a middle) thereof, a penetration hole 330 (since the center of the sensor board 33 housed and set in the gear housing 6 substantially matches the center axis O, for the sake of convenience, this center is indicated as a center O). The sensor board 33 is electrically connected to the sensor coil 31, and an electronic part or element that outputs an excitation signal to the sensor coil 31 is mounted on the sensor board 33. The sensor coil 31 outputs, as an impedance change, the relative rotation amount between the input shaft 21 and the output shaft 22 by application of the excitation signal. The sensor board 33 is provided with a circuit that calculates the steering torque in accordance with the impedance change of the sensor coil 31.

As can be seen in FIG. 2, the penetration hole 330 is a substantially circular hole that penetrates the sensor board 33 in the Z-axis direction. A diameter of the penetration hole 330 is set to be slightly greater than a diameter of the steering shaft 2 (the outer ring 322).

A diameter of the sensor board 33 is set to be slightly greater than a maximum diameter of the flange part 30b of the coil bobbin 30.

The sensor board 33 has a coil terminal connecting portion at the X-axis positive direction side with respect to the center O, also has a connecter terminal connecting portion at the X-axis negative direction side. The coil terminal connecting portion is formed at two places, at both Y-axis positive and negative direction sides, at an inner circumferential side of the sensor board 33. Each coil terminal connecting portion has a plurality of holes 331 (two holes 331). The connecter terminal connecting portion has a plurality of holes 332 (six holes 332) which cross the X-axis and run substantially parallel to the Y-axis.

Further, the sensor board 33 is provided with a plurality of holes 333 (two holes 333) as shown in FIG. 2. The two holes 333 are provided at an outer circumferential side of the sensor board 33, and one of them is located at the Y-axis positive direction side and the other is located at the Y-axis negative direction side. More specifically, as can be seen in FIG. 2, these two holes 333 slightly shift to the X-axis negative direction side.

These holes 331 to 333 penetrate the sensor board 33 in a direction (in the Z-axis direction) at right angles to an extending direction of the sensor board 33.

Each axial direction penetration hole 333 of the sensor board 33 and its surrounding part form a second held section.

The sensor housing 5 is formed by resin material, and houses therein the steering shaft 2 (the input shaft 21) and the torque sensor 3 (the sensor coil 31). As shown in FIG. 3A, the sensor housing 5 has a substantially cylindrical body part 5a, both axial ends (Z-axis direction both ends) of which open, and a flange part 5b. The flange part 5b is formed at an axial direction one side of the body part 5a (at a Z-axis negative direction one side of the body part 5a), and protrudes in the radially outward direction. The body part 5a is provided, at an inner peripheral side thereof (inside the body part 5a), with a dust seal supporting portion 50, a first bearing supporting portion 51 and the coil housing portion 52.

The dust seal supporting portion 50 is formed at a Z-axis positive direction side opening of the body part 5a. A dust preventive seal (a dust seal) 7a is set in the dust seal supporting portion 50, and the opening is closed by this dust seal 7a. The dust seal 7a is, for example, an oil seal with a lip. The dust seal 7a is press-fixed to the dust seal supporting portion 50 from the Z-axis positive direction.

The first bearing supporting portion 51 is formed at the Z-axis positive direction side of the body part 5a, and located at the Z-axis negative direction side of the dust seal supporting portion 50. The ball bearing 7b (a first bearing) is set at and supported by the first bearing supporting portion 51, and rotatably supports the input shaft 21. The ball bearing 7b is formed integrally with the first bearing supporting portion 51 of the sensor housing 5 by insert-molding.

The coil housing portion 52 is formed at almost half, in the axial direction, of the inner peripheral side of the body part 5a, and an inner peripheral surface of the coil housing portion 52 extends to a Z-axis negative direction side opening of the body part 5a. More specifically, the coil housing portion 52 is formed into a substantially cylindrical shape whose diameter is slightly greater than a Z-axis positive direction side inner peripheral surface of the body part 5a, then a step is formed at a boundary with the Z-axis positive direction side inner peripheral surface of the body part 5a.

The flange part 5b has a plurality of bolt hole forming portions 58 (three bolt hole forming portions 58) which are arranged at regular intervals in a circumferential direction of the sensor housing 5. Each bolt hole forming portion 58 is provided so as to protrude in the radially outward direction, and a bolt insertion hole penetrates the bolt hole forming portion 58 in the Z-axis direction.

The connecter 8, which connects the torque sensor 3 to external electronic equipment, is formed integrally with the sensor housing 5 at an outer peripheral side of the body part 5a so as to protrude in the radially outward direction. A plurality of connecter terminals 80 (six connecter terminals 80) that connect to the connecter 8 are formed integrally with the sensor housing 5 by insert-molding. A connecter terminal setting portion 53 is provided at the Z-axis negative direction side opening of the body part 5a.

The connecter terminal setting portion 53 is a recessed portion that is formed at a part, in a circumferential direction, of the coil housing portion 52 at the X-axis negative direction side so as to slightly sink in the Z-axis positive direction with respect to a Z-axis negative direction end surface of the flange part 5b.

Each of the connecter terminal 80 extends in a radially inward direction from the connecter 8, bends around a Z-axis positive direction end of the coil housing portion 52 and extends further in the Z-axis negative direction in the body part 5a, then protrudes from the connecter terminal setting portion 53 in the Z-axis negative direction. A top end of the connecter terminal 80, which protrudes from the connecter terminal setting portion 53, is positioned at the Z-axis negative direction side with respect to the body part 5a (a protruding portion 56). A plurality of the connecter terminals 80 (the six connecter terminals 80) are arranged in a straight line that runs substantially parallel to the Y-axis, and are substantially symmetric with respect to the X-axis.

A first protrusion 54 as a first holding section is formed integrally with the body part 5a at the Z-axis negative direction side opening of the body part 5a. The first protrusion 54 has a boss portion 540 and an inserting portion 541.

As shown in FIGS. 3A and 3B, the boss portion 540 has a ring shape (in an area except the connecter terminal setting portion 53) that extends in a direction orthogonal to the Z-axis, which rings or surrounds the coil housing portion 52. The boss portion 540 is formed into a protruding shape that slightly protrudes from the Z-axis negative direction end surface of the flange part 5b in the Z-axis negative direction.

The inserting portion 541 has a protrusion shape (a pin shape) that protrudes from a Z-axis negative direction end surface of the boss portion 540 in the Z-axis negative direction. A top end of the inserting portion 541 is positioned at the Z-axis negative direction side with respect to a Z-axis negative direction end of the sensor housing 5 (the Z-axis negative direction end surface of the flange part 5b). A plurality of the inserting portions 541 (three inserting portions 541) are arranged in a circumferential direction of the coil housing portion 52. More specifically, one of the three inserting portions 541 is located at the X-axis positive direction side with respect to the center axis O (in the substantially same Y-axis direction position as the center axis O), and the other two are located at the X-axis negative direction side (at both Y-axis positive and negative direction sides with respect to the center axis O).

The boss portion 540 has a width that is greater than an inside diameter of the axial direction penetration hole 304 of the coil bobbin 30. The inserting portion 541 has a smaller diameter than the inside diameter of the axial direction penetration hole 304 of the coil bobbin 30. Between the boss portion 540 and the inserting portion 541, a stepped portion 542 is formed.

The sensor housing 5 is provided with the cylindrical protruding portion 56 at an outer circumferential side of the boss portion 540 so as to ring or surround the boss portion 540.

The protruding portion 56 is formed so as to protrude from the Z-axis negative direction end surface of the flange part 5b in the Z-axis negative direction. A Z-axis negative direction end of the protruding portion 56 is positioned at the Z-axis negative direction side with respect to the Z-axis negative direction end surface of the boss portion 540, and also positioned at the Z-axis positive direction side with respect to a Z-axis negative direction end (the top end) of the inserting portion 541.

A recessed portion 57, which is provided between the boss portion 540 and the protruding portion 56 and into which the flange part 30b of the coil bobbin 30 is housed and set, is formed at an inner circumferential side of the protruding portion 56. A depth of the recessed portion 57, namely a Z-axis direction distance from the Z-axis negative direction end surface of the boss portion 540 to the Z-axis negative direction end of the protruding portion 56, is set to be less than or equal to a thickness (a Z-axis direction size) of the flange part 30b.

A second protrusion 55 as a second holding section is formed integrally with the body part 5a at the Z-axis negative direction side opening of the body part 5a. Two second protrusions 55 are provided at a slightly outer circumferential side with respect to the inserting portion 541 of the first protrusion 54, and one of them is located at the Y-axis positive direction side and the other is located at the Y-axis negative direction side. More specifically, as can be seen in FIG. 3B, these two second protrusions 55 slightly shift to the X-axis negative direction side. The second protrusion 55 has a boss portion 550 and an inserting portion 551. The boss portion 550 is formed so as to protrude from the Z-axis negative direction end surface of the boss portion 540 of the first protrusion 54 in the Z-axis negative direction. The inserting portion 551 is formed so as to protrude from a Z-axis negative direction end of the boss portion 550 in the Z-axis negative direction.

The boss portion 550 has a greater diameter than an inside diameter of the axial direction penetration hole 333 of the sensor board 33. On the other hand, the inserting portion 551 has a smaller diameter than the inside diameter of the axial direction penetration hole 333 of the sensor board 33. Between the boss portion 550 and the inserting portion 551, a stepped portion 552 is formed.

A height of the boss portion 550, namely a Z-axis direction distance from the Z-axis negative direction end surface of the boss portion 540 to the stepped portion 552, is set to be greater than the thickness of the flange part 30b and thicknesses (Z-axis direction sizes) of the first and second terminal setting parts 305, 306. A top end of the second protrusion 55 (the inserting portion 551) is positioned at the Z-axis negative direction side with respect to the top end of the first protrusion 54 (the inserting portion 541).

The gear housing 6 is formed by aluminum based metal material. The gear housing 6 has, as integral parts, a long narrow tubular rack tube for housing therein the rack shaft and the gear housing part 6a that is a gear box for housing therein the steering shaft 2 (the output shaft 22) and the rack-and-pinion gear. The gear housing 6 could be formed by resin material.

As shown in FIG. 1, the gear housing part 6a has a hollow cylindrical shape. The gear housing part 6a is provided, at an inner peripheral side thereof (inside the gear housing part 6a), with a second bearing supporting portion 61, a retainer supporting portion 62 and a board housing portion 63.

The second bearing supporting portion 61 is formed at a Z-axis positive direction side of the gear housing part 6a, and is substantially cylindrical in shape. A ball bearing 7c, which is a bearing that rotatably supports the Z-axis positive direction end of the output shaft 22, is set at and supported by the second bearing supporting portion 61. An outer ring of the ball bearing 7c is fitted and set to an inner circumference of the second bearing supporting portion 61.

The retainer supporting portion 62 abuts on a Z-axis positive direction side of the second bearing supporting portion 61, and has such substantially cylindrical shape that the second bearing supporting portion 61 is ringed or surrounded. A ring-shaped retainer 7d is fitted and set to an inner circumference of the retainer supporting portion 62. The outer ring of the ball bearing 7c is supported by being sandwiched between a Z-axis negative direction end surface of the retainer 7d and a bottom surface (a Z-axis positive direction end surface) of the second bearing supporting portion 61.

The board housing portion 63 abuts on a Z-axis positive direction side of the retainer supporting portion 62, also abuts on a Z-axis positive direction side opening of the gear housing part 6a at the Z-axis positive direction side. The board housing portion 63 has such substantially cylindrical shape that the retainer supporting portion 62 is ringed or surrounded. More specifically, the board housing portion 63 has a greater diameter than an inner circumferential surface of the retainer supporting portion 62, then a step is formed at a boundary with the inner circumferential surface of the retainer supporting portion 62. The board housing portion 63 opens at the Z-axis positive direction side of the gear housing part 6a. Further, a diameter of an inner circumferential surface of the board housing portion 63 is set to be slightly greater than a diameter of an outer circumferential surface of the protruding portion 56 of the sensor housing 5. The sensor board 33 of the torque sensor 3 is housed in the board housing portion 63. More specifically, the sensor board 33 is set and held in the board housing portion 63 so as to extend in a direction substantially orthogonal to the steering shaft 2.

The gear housing 6 has, at an outer circumferential side of the board housing portion 63, a plurality of bolt hole forming portions 64 (three bolt hole forming portions 64) which are arranged at regular intervals in the circumferential direction. Each bolt hole forming portion 64 is provided so as to protrude in the radially outward direction, and a bolt insertion hole penetrates the bolt hole forming portion 64 in the Z-axis direction. The bolt hole forming portion 64 is a flange part (of the gear housing 6) provided at an axial direction one side (at the Z-axis positive direction side) of the gear housing part 6a.

A method for assembling the system 1 has a bobbin inserting process, a first riveting (or fixing) process, a board setting (or installing) process and a second riveting (or fixing) process. These processes take place in this order, the power steering system 1 is then assembled.

In the bobbin inserting process, as shown in FIGS. 3A and 3B, the sensor housing 5, with the ball bearing 7b and the connecter 8 (the connecter terminals 80) formed by the insert-molding and the seal member 7a etc. installed, is prepared. Then, the coil bobbin 30 is inserted and set in the coil housing portion 52 of this sensor housing 5 from the Z-axis negative direction, as shown in FIGS. 4A and 4B.

In the first riveting (or fixing) process, as shown FIGS. 4A and 4B, the coil bobbin 30 is fixed to the sensor housing 5. As will be explained in more detail, the first protrusion 54 exposed and protruding from the Z-axis negative direction side opening of the sensor housing 5 forms a first riveting portion 543 that fixes the coil bobbin 30. First, the coil bobbin 30 is set to the first protrusion 54 of the sensor housing 5. When viewed from the Z-axis direction, the coil bobbin 30 is set so that positions of the axial direction penetration holes 304 of the first to third flange parts 301 to 303 match or agree with the respective inserting portions 541 of the first protrusion 54. Each of the inserting portions 541 is then inserted into the axial direction penetration hole 304 from the Z-axis positive direction toward the Z-axis negative direction. The stepped portion 542 (a Z-axis negative direction end surface of the boss portion 540) formed between the boss portion 540 and the inserting portion 541 touches or is contiguous with (a Z-axis positive direction end surface of) the flange part 30b of the coil bobbin 30 (namely that the flange part 30b is set to the recessed portion 57 of the sensor housing 5), and the inserting portion 541 made of the resin material penetrates the axial direction penetration hole 304 and protrudes from the flange part 30b in the Z-axis negative direction.

Next, as mentioned above, the sensor housing 5 (the inserting portion 541) is formed by the resin material. Thus, by performing the riveting in a molten state, the first riveting portion (an enlarged portion) 543 is formed, then the coil bobbin 30 is fixed to the sensor housing 5 by this first riveting portion 543. In this manner, the first riveting portion 543 is provided at the sensor housing 5. More specifically, the above-mentioned protruding part of the inserting portion 541 is melted and deformed so that a radial direction size of this protruding part becomes greater than the inside diameter of the axial direction penetration hole 304, thereby forming the first riveting portion 543.

As explained above, with regard to the first riveting portion 543, the first holding section (the enlarged portion) is formed in the molten state, and this first holding section (the enlarged portion) engages with and holds the first held section (the surrounding part of the axial direction penetration hole 304), thus the coil bobbin 30 is fixed to the sensor housing 5. In other words, by deforming the first riveting portion (the inserting portion 541 of the first protrusion 54) after melting the inserting portion 541 with the first held section (an inner circumference and the surrounding part of the axial direction penetration hole 304) touching or making contact with the first riveting portion (the first protrusion 54), the coil bobbin 30 is fixed to the sensor housing 5.

Here, the depth of the recessed portion 57 where the flange part 30b is set, is set to be less than or equal to the thickness of the flange part 30b. Therefore, the first riveting portion 543 is positioned at the Z-axis negative direction side with respect to the Z-axis negative direction end of the sensor housing 5 (the Z-axis negative direction end of the protruding portion 56).

In the board setting (or installing) process, as shown in FIGS. 5A and 5B, the sensor board 33 is set. The second protrusion 55 (see FIG. 4A) exposed and protruding, with respect to the first protrusion 54, in the Z-axis negative direction from the Z-axis negative direction side opening of the sensor housing 5 forms a second riveting portion 553 that fixes the sensor board 33. First, the sensor board 33 is set to the second protrusion 55 of the sensor housing 5. When viewed from the Z-axis direction, the sensor board 33 is set so that positions of the axial direction penetration holes 333 of the sensor board 33 match or agree with the respective inserting portions 551 of the second protrusion 55. Each of the inserting portions 551 is then inserted into the axial direction penetration hole 333. The stepped portion 552 (a Z-axis negative direction end surface of the boss portion 550) formed between the boss portion 550 and the inserting portion 551 touches or is contiguous with (a Z-axis positive direction end surface of) the sensor board 33, and the inserting portion 551 penetrates the axial direction penetration hole 333 and protrudes from the sensor board 33 in the Z-axis negative direction.

Here, the height of the boss portion 550 is set to be greater than or equal to the thickness of the flange part 30b (including the first and second terminal setting parts 305, 306) of the coil bobbin 30. Therefore, the sensor board 33 is positioned at the Z-axis negative direction side with respect to the flange part 30b (including the first and second terminal setting parts 305, 306).

Further, the sensor board 33 is set so that, positions of the coil terminals 34 provided at the coil bobbin 30 match or agree with the respective holes 331 of the coil terminal connecting portion of the sensor board 33, also positions of the connecter terminals 80 of the sensor housing 5 match or agree with the respective holes 332 of the connecter terminal connecting portion of the sensor board 33. Each coil terminal 34 extends from the coil bobbin 30 in the Z-axis direction and is inserted into the hole 331, and protrudes from the sensor board 33 Z-axis negative direction. Each connecter terminal 80 extends from the sensor housing 5 in the Z-axis direction and is inserted into the hole 332, and protrudes from the sensor board 33 Z-axis negative direction.

In the second riveting (or fixing) process, as shown in FIGS. 5A and 5B, the sensor board 33 is fixed to the sensor housing 5. Since the sensor housing 5 (the inserting portion 551) is made of the resin material, by performing the riveting in the molten state, the second riveting portion (an enlarged portion) 553 is formed, then the sensor board 33 is fixed to the sensor housing 5 by this second riveting portion 553. In this manner, the second riveting portion 553 is provided at the sensor housing 5. More specifically, the above-mentioned protruding part of the inserting portion 551 is melted and deformed so that a radial direction size of this protruding part becomes greater than the inside diameter of the axial direction penetration hole 333, thereby forming the second riveting portion 553.

As explained above, with regard to the second riveting portion 553, the second holding section (the enlarged portion) is formed in the molten state, and this second holding section (the enlarged portion) engages with and holds the second held section (the surrounding part of the axial direction penetration hole 333), thus the sensor board 33 is fixed to the sensor housing 5. In other words, by deforming the second riveting portion (the inserting portion 551 of the second protrusion 55) after melting the inserting portion 551 with the second held section (an inner circumference and the surrounding part of the axial direction penetration hole 333) touching or making contact with the second riveting portion (the second protrusion 55), the sensor board 33 is fixed to the sensor housing 5.

Here, as shown in FIG. 5A, the sensor board 33 is fixed to the sensor housing 5 by the second riveting portion 553 so as to be positioned at the Z-axis negative direction side with respect to the Z-axis negative direction end of the sensor housing 5 (the Z-axis negative direction end of the protruding portion 56).

Further, elements or components for connecting the sensor housing 5 and the sensor board 33 or fixing the sensor board 33 to the sensor housing 5 are arranged so as not to interfere with the flange part 30b of the coil bobbin 30 and the first and second terminal setting parts 305, 306. That is, as shown in FIG. 2, when viewed from the Z-axis, the second riveting portion 553 (the second protrusion 55) is placed in a wedge-shaped area formed between the second flange part 302 and the first terminal setting part 305 or/and between the third flange part 303 and the second terminal setting part 306. In addition, when viewed from the Z-axis, each of the connecter terminals 80 (each of the holes 332 of the connecter terminal connecting portion of the sensor board 33) is placed in a crescent-shaped area formed at a radially outer side with respect to the one sides at the X-axis negative direction side of the second and third flange parts 302 and 303.

In the first and second riveting processes, the riveting is not especially limited. For instance, infrared thermal riveting or ultrasonic riveting could be used. In the case of the infrared thermal riveting, because of no vibration when riveted and a small influence from heat, it is possible to suppress an adverse effect on the sensor coil 31 and the sensor board 33. In the case of the ultrasonic riveting, a riveting device is relatively small. This allows the riveting device to be easily inserted in a space where the riveting is performed, and results in size reduction of the system 1.

After the assembly, a soldering process and a unitization process take place.

In the soldering process, after the second riveting process, the coil terminals 34 and the connecter terminals 80 are soldered to the sensor board 33. The coil terminals 34 and the connecter terminals 80 are fixed (bonded) and electrically connected to the sensor board 33, for example, by a flow-soldering that soaks a Z-axis negative direction side surface of the sensor board 33 in a solder liquid surface. Here, the electronic parts or elements mounted on the sensor board 33 are fixed (bonded) and electrically connected to the sensor board 33, for example, by a reflow-soldering.

In the unitization process, the gear housing 6, with the ball bearing 7c, the retainer 7d, the steering shaft 2 (including the variable magnetic path-resistance member 32), etc. installed, is prepared. This gear housing 6 is combined with the sensor housing 5 from the Z-axis negative direction, then the Z-axis negative direction side opening of the sensor housing 5 is closed.

As shown in FIG. 1, the steering shaft 2 penetrates the penetration hole 330 of the sensor board 33 and an inner peripheral side of the coil bobbin 30 from the Z-axis positive direction side. The inner circumference at a Z-axis positive direction end of the board housing portion 63 of the gear housing 6 is fitted onto the outer circumference of the protruding portion 56 of the sensor housing 5. The bolt hole forming portions 64 of the gear housing 6 are connected to the bolt hole forming portions 58 of the sensor housing 5.

A seal member 7e is set at a periphery of a Z-axis positive direction end surface of the bolt hole forming portion 64 (i.e. at the Z-axis positive direction end inner circumference of the board housing portion 63). Further, each bolt 7f is inserted into the bolt insertion holes of the bolt hole forming portions 58 and the bolt hole forming portions 64, the both housing 5, 6 are then connected together. In this state, the board housing portion 63 faces to and communicates with the Z-axis negative direction side opening of the sensor housing 5 (the coil housing portion 52).

The Z-axis positive direction end of the output shaft 22 is set in the penetration hole 330 of the sensor board 33, and the center O of the sensor board 33 substantially matches or agrees with the center axis O of the steering shaft 2.

The flange part 30b of the coil bobbin 30 and the sensor board 33 are set in the housing 4 so as to extend in the direction substantially orthogonal to the Z-axis (i.e. in the radial direction). Further, when viewed from the Z-axis, the flange part 30b and the sensor board 33 are set in the housing 4 so as to be arranged in layers and overlap each other. In other words, one of the flange part 30b and the sensor board 33 is located at the Z-axis negative direction side (at the gear housing 6 side) with respect to the other in the Z-axis direction (in the direction in which the steering shaft 2 extends).

In this embodiment, the sensor board 33 is located at the Z-axis negative direction side with respect to the flange part 30b. The riveting portion (the first riveting portion 543) provided at the one (the flange part 30b), which is located at the Z-axis positive direction side (the sensor housing 5 side), of the flange part 30b and the sensor board 33 is disposed so as to overlap the other (the sensor board 33) which is located at the Z-axis negative direction side (at the gear housing 6 side) when viewed from the Z-axis (in the direction orthogonal to the steering shaft). As illustrated by the broken line in FIG. 2, when viewed from the Z-axis, the first riveting portion 543 overlaps the sensor board 33. In the embodiment 1, the first riveting portion 543 is disposed so as to be positioned within an area of the sensor board 33 (between an outer peripheral edge of the sensor board 33 and the penetration hole 330).

Structural Advantage of Embodiment 1

Next, structural advantages of the system 1 will be explained. As shown in FIG. 1, the sensor board 33 and the sensor coil 31 are arranged so that the sensor board 33 extends in the direction substantially orthogonal to the axis of the sensor coil 31 (the coil bobbin 30) and also the axis of the sensor coil 31 is positioned within the sensor board 33 when viewed from the Z-axis. With this arrangement, namely that since the sensor board 33 is located on the axis of the sensor coil 31, in other words, by arranging the sensor coil 31 and the sensor board 33 parallel in the axial direction, spread of the sensor coil 31 and the sensor board 33 in the direction substantially orthogonal to the steering shaft 2 (i.e. in the radial direction) is suppressed, and their setting space in the radial direction becomes small. This allows size reduction, in the radial direction, of the system 1, and improves the vehicle-mount layout of the system 1.

More specifically, the coil bobbin 30 is approximately cylindrical in shape and the sensor board 33 has a substantially ring-shape, and the both 30 and 33 are arranged on the axis O so that both axes are substantially aligned with each other.

Further, the steering shaft 2 is set on the same axes of the both coil bobbin 30 and sensor board 33. Thus, the spread in the radial direction of the sensor board 33 with respect to the steering shaft 2 can be suppressed, and this also brings the above advantage.

Here, although the above advantage can be gained even if the flange part 30b of the coil bobbin 30 is not formed, in the present embodiment 1, the flange part 30b is provided. Then, this flange part 30b and the sensor board 33 are set so that these flange part 30b and sensor board 33 extend in the direction orthogonal to the Z-axis and are arranged parallel in the Z-axis. Thus, in the case where the flange part 30b is formed at the coil bobbin 30, the above advantage can be gained.

In addition, the arrangement of the sensor board 33 so as to face to the axial direction end (the flange part 30b) of the coil bobbin 30 simplifies a connecting structure between the sensor coil 31 and the sensor board 33.

In the embodiment 1, the sensor board 33 is set so as to overlap the first and second terminal setting parts 305, 306 (the coil terminals 34) of the coil bobbin 30 when viewed from the Z-axis. Thus, the coil terminals 34 can be directly connected to the sensor board 33 without a harness etc. For instance, when setting the sensor board 33 to the housing 4 side in the board setting process, all an assembler has to do is to connect the coil terminals 34 as they are, which extend in the Z-axis negative direction from each of the first and second terminal setting parts 305, 306, to the sensor board 33 (the respective holes 331 of the coil terminal connecting portion). Or, after the setting of the sensor board 33, the coil terminals 34 could be connected to the respective holes 331. In this case, in a state in which the sensor board 33 is set to the housing 4 side, all the assembler has to do is to insert the linear coil terminals 34 into the sensor board 33 (the respective holes 331) from the Z-axis negative direction and to fix the coil terminals 34 to the first and second terminal setting parts 305, 306. With these assembly and connection, connectivity between the sensor coil 31 and the sensor board 33 is improved, and the structure of the system 1 can be simplified, also this increases efficiency in manufacturing.

Likewise, in the embodiment 1, the sensor board 33 is set so as to face to the connecter terminals 80. Thus this can simplify a connecting structure between the connecter 8 and the sensor board 33. More specifically, the sensor board 33 is set so as to overlap the connecter terminal setting portion 53 (the connecter terminals 80) of the sensor housing 5 when viewed from the Z-axis. Thus, as same as the coil terminal 34, the connecter terminals 80 can be directly connected to the sensor board 33 without a harness etc., and the structure of the system 1 can be simplified, also this increases efficiency in manufacturing.

Additionally, the sensor board 33 is set in the board housing portion 63 provided at the opening of the gear housing 6 (the gear housing part 6a). Therefore, when the opening of the gear housing 6 is closed by the fact that the gear housing 6 is combined with the sensor housing 5, the board housing portion 63 is closed at the same time and is cut off or separated from the outside of the housing 4. This structure eliminates the need for a cover member or a sealing member which is used for securing air-tightness (the seal) of the board housing portion 63. As a consequence, parts count of the system 1 can be reduced, also this increases efficiency in manufacturing. Here, in the embodiment 1, although the board housing portion 63 is provided at the gear housing 6 (the gear housing part 6a), the board housing portion 63 might be provided at the sensor housing 5 side.

In the embodiment 1, by providing the flange part 30b at the coil bobbin 30, the coil bobbin 30 can be surely fixed to the housing 4 (the sensor housing 5). Further, since positioning of the coil bobbin 30 with respect to the housing 4 is made by the flange part 30b, accuracy of a position of the sensor coil 31 with respect to the steering shaft 2 that is set in the same housing 4 is increased. This brings about improvement in detection accuracy of the torque sensor 3.

Furthermore, the flange part 30b has the first to third flange parts 301 to 303, and the coil bobbin 30 is fixed to the housing 4 (the sensor housing 5) at the three points in the circumferential direction by the first held section (the axial direction penetration hole 304) provided at each of the first to third flange parts 301 to 303. Thus, accuracy of a position in the radial direction of the coil bobbin 30 (the sensor coil 31) can be increased, and this brings about improvement in detection accuracy of the torque sensor 3.

In the embodiment 1, the flange part 30b is fixed to the sensor housing 5. Thus, as compared with a case of a comparative example 1 shown in FIG. 10 where a flange part 30b is fixed to a gear housing 6, an accurate positioning of the coil bobbin 30 (the sensor coil 31) with respect to the sensor housing 5 can be achieved.

Figure 10:
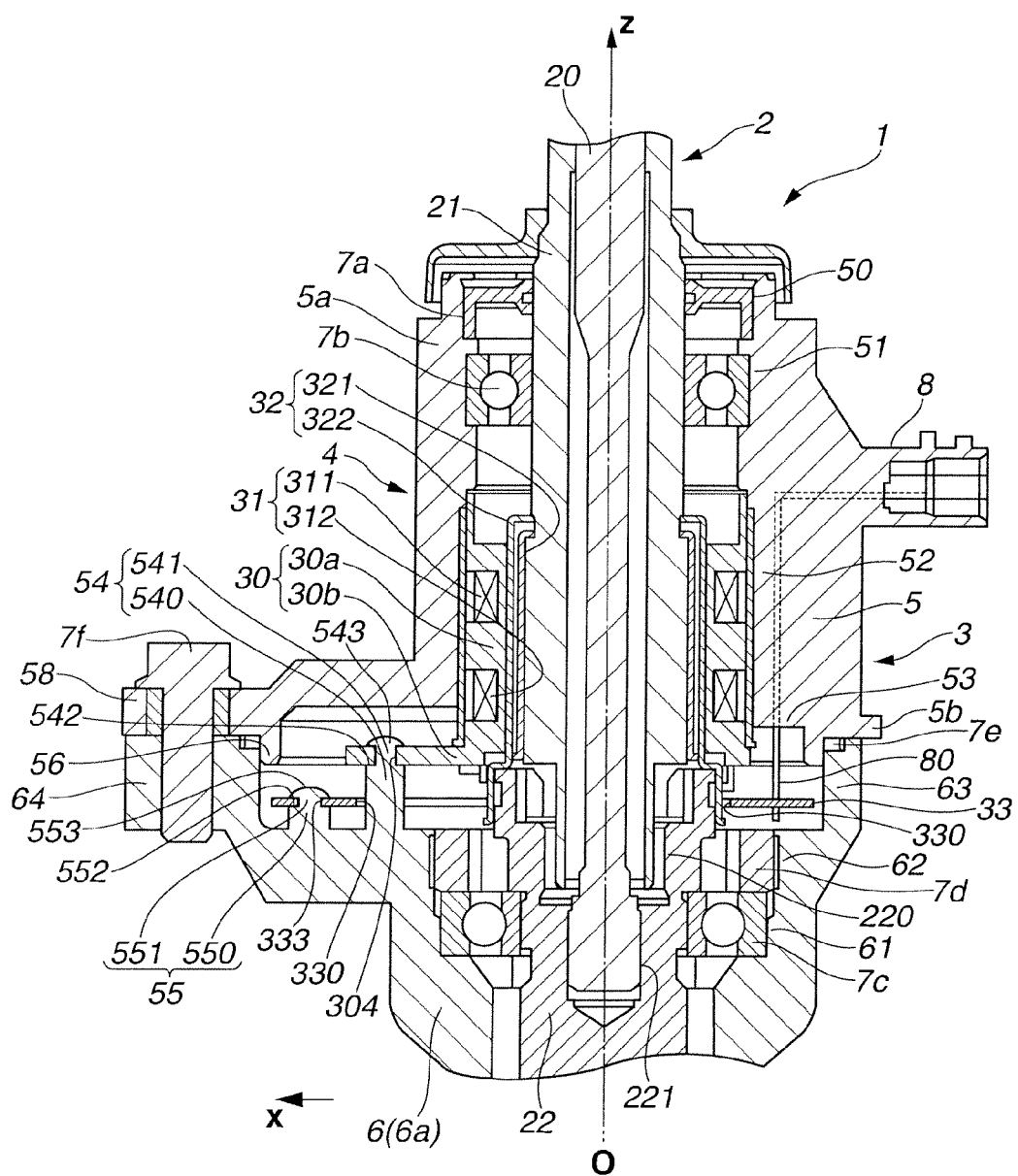
FIG. 10 is a local sectional view of a power steering system, cut in the steering shaft direction, of a comparative example 1.

FIG. 10 shows a cross section of a system 1 of the comparative example 1, longitudinally cut along the center axis O, same as FIG. 1. In the comparative example 1, the gear housing 6 is formed by resin material, and a first protrusion 54 as a first holding section and a second protrusion 55 as a second holding section are formed integrally with the gear housing 6. The first protrusion 54 and the second protrusion 55 are formed so as to protrude from a bottom, at the Z-axis negative direction side, of a board housing portion 63 toward the Z-axis positive direction. The first protrusion 54 and the second protrusion 55 have boss portions 540, 550 and inserting portions 541, 551 respectively.

The first protrusion 54 is provided so as to penetrate an inner circumferential side of a sensor board 33 (a penetration hole 330), and forms a first riveting portion 543 that fixes a coil bobbin 30. The second protrusion 55 forms a second riveting portion 553 that fixes the sensor board 33. The first protrusion 54 is set to be higher than the second protrusion 55. The first riveting portion 543 is formed at the Z-axis positive direction side with respect to the second riveting portion 553. The other configuration or structure is the same as the embodiment 1, thus the same components as the embodiment 1 are denoted by the same reference numbers, and an explanation of these components is omitted.

The flange part 30b of the coil bobbin 30 could be fixed to the gear housing 6 as explained in this comparative example 1. However, since the embodiment 1 employs the structure in which the flange part 30b is fixed to the sensor housing 5, a more accurate positioning of the coil bobbin 30 (the sensor coil 31) with respect to the sensor housing 5 can be achieved, and this brings about improvement in detection accuracy of the torque sensor 3.

The sensor board 33 is fixed to and held by the sensor housing 5 by the fact that the connecter terminals 80 set at the sensor housing 5 are soldered to the sensor board 33. Also the sensor board 33 is fixed to and held by the coil bobbin 30 by the fact that the coil terminals 34 set at the coil bobbin 30 are soldered to the sensor board 33. Thus, even if the sensor board 33 is not fixed to the sensor housing 5 by the second holding section (the second riveting portion 553), it is possible to fix the sensor board 33 to the housing 4 side. In the present embodiment 1, the sensor board 33 is provided with the second held section (the axial direction penetration hole 333), and the sensor board 33 is fixed to the sensor housing 5 by the second holding section (the second riveting portion 553). Hence, even if a fixing strength of the soldering is decreased or an inadequate fixing strength arises, the sensor board 33 is surely fixed to the housing 4 side (this is a fail-safe function or structure).

In the embodiment 1, the second holding section (the second riveting portion 553) is provided at two places, and these two second holding sections (the two second riveting portions 553) are arranged at opposing positions in the radial direction with respect to the center axis O. Consequently, the fixing strength can be increased while limiting the number of the second holding sections (the second riveting portions 553) to the minimum.

Moreover, the second holding sections (the second riveting portions 553) are arranged between the connecter terminals 80 (a soldering area between the connecter terminals 80 and the sensor board 33) and the coil terminals 34 (a soldering area between the coil terminals 34 and the sensor board 33) in the circumferential direction. It is therefore possible to fix and hold the sensor board 33 to and by the housing 4 side uniformly in the circumferential direction.

Here, unlike the coil bobbin 30, because an exact positioning of the sensor board 33 with respect to the sensor housing 5 (the steering shaft 2) is not required, this allows a slight inclination of the sensor board 33 with respect to a plane orthogonal to the steering shaft 2 upon the fixing of the sensor board 33.

The sensor board 33 is disposed at the other unit (the gear housing 6) side of the housing 4 (i.e. at the Z-axis negative direction side with respect to the Z-axis negative direction end of the protruding portion 56) with respect to the axial direction end portion (the Z-axis negative direction end of the protruding portion 56) of the one unit (the sensor housing 5) of the housing 4 to which the sensor board 33 is fixed. Therefore, unlike the comparative example 1 in which the sensor board 33 is not disposed at the other unit (the sensor housing 5) side with respect to the axial direction end portion (the Z-axis positive direction end portion) of the one unit (the gear housing 6), it is possible to prevent the electronic parts or elements mounted on the sensor board 33 from interfering to with the one unit (the sensor housing 5).

Further, since it is possible to prevent the one unit (the sensor housing 5) of the housing 4 to which the sensor board 33 is fixed from interfering with the sensor board 33 in the board setting process, the soldering process and an inspection process for checking a solder bonding state, the workability can be improved in the above processes.

As will be explained in more detail, in the assembly in which the coil terminals 34 and the connecter terminals 80 are inserted into the respective holes 331, 332 of the sensor board 33, for instance, even if there is a need to use an assembly jig of comb teeth to arrange the terminals 34, 80, the one unit (the sensor housing 5) does not interfere with this arranging work. Furthermore, when soldering the terminals 34, 80 to the sensor board 33, the one unit (the sensor housing 5) does not interfere with this soldering work. Thus, the flow-soldering can be easily employed. In addition, a visual inspection of the solder bonding state can be easily made.

Here, it might not be required that the flange part 30b and the sensor board 33 be fixed to the same unit of the housing 4. In the embodiment 1, both the flange part 30b and the sensor board 33 are fixed to the one unit (the sensor housing 5), and the flange part 30b is located at the one unit (the sensor housing 5) side (i.e. at the Z-axis positive direction side), and the sensor board 33 is located at the other unit (the gear housing 6) side (i.e. at the Z-axis negative direction side). Therefore, unlike the comparative example 1 in which both the flange part 30b and the sensor board 33 are fixed to the one unit (the gear housing 6) and the sensor board 33 is located at the one unit (the gear housing 6) side (i.e. at the Z-axis positive direction side) and the flange part 30b is located at the other unit (the sensor housing 5) side (i.e. at the Z-axis negative direction side), it is possible to prevent the flange part 30b from interfering with the sensor board 33 in the soldering process and the inspection process for checking the solder bonding state, and the workability can be improved in the above processes.

As will be explained in more detail, when soldering the terminals (the connecter terminals 80 and the coil terminals 34) and the electronic parts or elements to the sensor board 33, since the flange part 30b and the first holding section (the first riveting portion 543) do not interfere with this soldering work, the workability can be improved (for instance, the flow-soldering can be easily employed). Also when checking the solder bonding state of the sensor board 33, the sensor board 33 does not interfere with this checking work. The visual inspection of the solder bonding state can be easily made, and this increases efficiency in the inspection.

In the embodiment 1, both the flange part 30b and the sensor board 33 are fixed to the sensor housing 5 side. Thus, all the work in the bobbin inserting process, the first riveting process, the board setting process and the second riveting process can be done from the axial direction one side (the Z-axis negative direction side) of the sensor housing 5.

For example, if the sensor housing 5 is set so that the Z-axis negative direction side opening of the sensor housing 5 faces to an upper side in a vertical direction, the following work; to insert and set the coil bobbin 30 to the sensor housing 5, to fix the coil bobbin 30 by forming the first riveting portion 543, to set the sensor board 33, and to fix the sensor board 33 by forming the second riveting portion 553, can be done, as a series of assembly flow, from the upper side in the vertical direction. There is no need to change the orientation, in the vertical direction, of the sensor housing 5 during these work.

Since the assembly can be done from the axial direction one side of the sensor housing 5 in this way, it is possible to increase productivity of the system 1.

Further, as mentioned above, both the flange part 30b and the sensor board 33 are fixed to the sensor housing 5 side, also the flange part 30b is located at the sensor housing 5 side (i.e. at the Z-axis positive direction side), and the sensor board 33 is located at the gear housing 6 side (i.e. at the Z-axis negative direction side). It is thus possible to prevent the coil holding part 30a of the sensor coil 31 from interfering with the sensor board 33 in the soldering process and the inspection process for checking the solder bonding state, and the workability can be improved in the above processes.

As the material of the sensor housing 5, material except the resin could be used. For instance, metal material such as aluminum alloy could be used. In the present embodiment 1, since the sensor housing 5 is formed by the resin material, this brings about the effect of simplifying the structure of the system 1 and reducing the size of the system 1.

Although the power steering system whose sensor housing is formed by the resin material has been known, in this power steering system, location or layout of the sensor coil and the sensor board and their assembling manner, which should be a challenge in the case where the sensor housing is formed by the resin material, are not sufficiently taken into account. As a consequence, the advantages by the fact that the sensor housing is formed by the resin material, is not fully produced.

For example, in the system disclosed in JP2009-298246, the sensor board is set in a board housing that is formed on a radial direction side surface of a sensor housing. Thus, a size, in the radial direction, of the system increases by a space for forming the board housing, and an improvement in vehicle-mount layout which is one of advantages by the resin-made housing is difficult. Further, an additional cover member or sealing member which is used for securing air-tightness (the seal) of the board housing portion is required, thus reduction in parts count which is also one of advantages by the resin-made housing is impossible.

In contrast to this, in the embodiment 1, as described above, the sensor board 33 and the sensor coil 31 (the coil bobbin 30) are arranged parallel not in the radial direction but in the axial direction (in the direction in which the steering shaft 2 extends) so as to overlap each other when viewed from the Z-axis. No additional housing to house the sensor board 33 is provided on a radial direction side surface of the housing 4 (e.g. at an outer side, in the radial direction, of the sensor coil 31). Hence, the size reduction in the radial direction of the system 1 can be achieved, then the vehicle-mount layout can be improved.

Further, the sensor board 33 is housed in the opening (in the board housing portion 63 provided at the opening) of the one unit (the sensor housing 5) that forms the housing 4. Thus, only by closing the opening with the other unit (the gear housing 6) that also forms the housing 4, the sensor board 33 is hermetically housed in the housing 4. No additional cover member or sealing member for securing air-tightness (the seal) of the board housing portion 63 is required, thereby reducing the parts count of the system 1.

The connecter 8 is formed integrally with the sensor housing 5 by the resin material. In addition, the connecter terminals 80 and the first bearing (the ball bearing 7b) are formed at the sensor housing 5 by the insert-molding. Parts count and man-hour of assembly can therefore be reduced.

The sensor board 33 and the coil bobbin 30 are arranged so that both axes are substantially aligned with each other. Furthermore, an inner peripheral edge of the sensor board 33 (a circle, around the center O, of the sensor board 33 which is defined by point-set whose distance from the center O to the sensor board 33 is a minimum, i.e. an inscribed circle. In the embodiment 1, it is an inner circumference of the penetration hole 330) is positioned at a radially inward side (at a side toward the center O in the direction orthogonal to the steering shaft 2) with respect to the first holding section (the first riveting portion 543) that fixes the flange part 30b of the coil bobbin 30. Therefore, as compared with a case where the inner peripheral edge of the sensor board 33 is provided at a radially outward side with respect to the first holding section (the first riveting portion 543), the sensor board 33 extends in the radially inward direction. An area on the sensor board 33 where the electronic parts or elements are mounted can extend. In other words, an increase in size in the radially outward direction of the sensor board 33 can be suppressed while mounting the essential electronic parts or elements on the sensor board 33, thereby allowing size reduction, in the radial direction, of the system 1.

The first holding section (the first riveting portion 543) that fixes the flange part 30b is provided so as to be positioned at the radially inward side with respect to the outer peripheral edge of the sensor board 33 (a circle, around the center O, of the sensor board 33 which is defined by point-set whose distance from the center O to the sensor board 33 is a maximum, i.e. a circumscribed circle of the sensor board 33). Thus, even though the flange part 30b (which extends in the radially outward direction) is provided at the coil bobbin 30, it is possible to prevent the first holding section (the first riveting portion 543) from lying off the sensor board 33 to the radially outward side (to an outer side of the circumscribed circle of the sensor board 33), thereby allowing further size reduction, in the radial direction, of the system 1.

The flange part 30b and the sensor board 33 are arranged so as to overlap each other when viewed from the Z-axis. Therefore, as compared with a case where both the flange part 30b and the sensor board 33 do not overlap each other, an increase in size in the radially outward direction of the system 1, which is equivalent to the overlap, can be suppressed. For instance, it is possible to prevent the sensor board 33 from extending off the flange part 30b to the radially outward side by an amount of the overlap. The size reduction, in the radial direction, of the system 1 can thus be achieved.

One (the sensor board 33) of the flange part 30b and the sensor board 33 is located at an upper side (i.e. at a side that is away from the unit to which the sensor board 33 and the flange part 30b are fixed) with respect to the other (the flange part 30b), namely that the one (the sensor board 33) is located at the gear housing 6 side (i.e. at the Z-axis negative direction side). Further, the riveting portion (the first riveting portion 543) of the both riveting portions (the first and second riveting portions 543, 553), which is provided at the other (the flange part 30b), is positioned so as to overlap the one (the sensor board 33) in the radial direction when viewed from the Z-axis direction. Therefore, it is possible to prevent the riveting portion (the first riveting portion 543) provided at the other (the flange part 30b) from sticking out from the one (the sensor board 33) in the radial direction by an amount of the overlap. The size reduction, in the radial direction, of the system 1 can thus be achieved.

Here, the riveting portion (the first riveting portion 543) provided at the other (the flange part 30b) could partly overlap the one (the sensor board 33) in the radial direction when viewed from the Z-axis direction.

In the embodiment 1, the sensor board 33 is located at the one side, namely that the sensor board 33 is set at the upper side with respect to the flange part 30b, i.e. at the gear housing 6 side (at the Z-axis negative direction side). The first holding section (the first riveting portion 543) that fixes the flange part 30b is set so as to overlap the sensor board 33 in the radial direction when viewed from the Z-axis direction. Therefore, since the area on the sensor board 33 where the electronic parts or elements are mounted can extend by the amount of the overlap, the increase in size in the radially outward direction of the sensor board 33 can be suppressed, and the size reduction in the radial direction of the system 1 can be achieved. This will be explained below using a comparative example 2 shown in FIG. 11.

Figure 11:
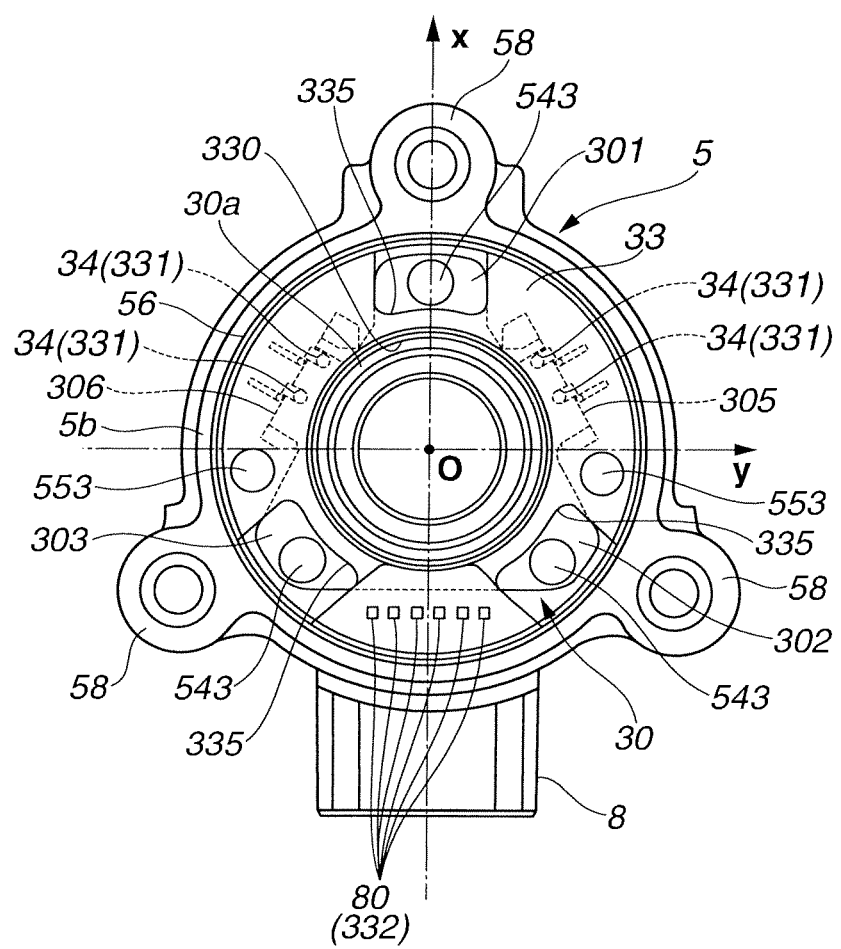
FIG. 11 is a bottom view of a power steering system, when viewing a unit of a sensor housing side from the steering shaft direction, of a comparative example 2.

FIG. 11 is a bottom view of a completed unit of the sensor housing 5 side of the comparative example 2, when viewed from the Z-axis negative direction. Unlike the embodiment 1, in the comparative example 2, a cutting portion 335 is formed at an outer peripheral side of the sensor board 33. The cutting portion 335 is provided at such position that the cutting portion 335 overlaps the first holding section (the first riveting portion 543) when viewed from the Z-axis direction. In this comparative example 2, even when the sensor board 33 is set at the upper side (i.e. at the side that is away from the unit to which the sensor board 33 and the flange part 30b are fixed) with respect to the flange part 30b, the first riveting portion 543 can be formed at the flange part 30b through the cutting portion 335. That is, after the coil bobbin 30 is set at the one unit and the sensor board 33 is set, it is possible to form the first riveting portion 543 while avoiding the interference of the sensor board 33 and to fix the coil bobbin 30 to the one unit.

However, in this configuration or structure of the comparative example 2, the area on the sensor board 33 where the electronic parts or elements are mounted is reduced by an area of the cutting portion 335.

In contrast to this, the embodiment 1 has no cutting portion 335, and employs the structure in which the sensor board 33 overlaps the first holding section (the first riveting portion 543) when viewed from the Z-axis direction. With this structure, the area on the sensor board 33 where the electronic parts or elements are mounted can extend by the amount of the overlap (by the area of the cutting portions 335 in FIG. 11) with a radius of the circumscribed circle of the sensor board 33 unchanged. In other words, size reduction of the sensor board 33 is possible while mounting the essential electronic parts or elements on the sensor board 33, and thus the size in the radial direction of the system 1 can be further reduced.

The first holding section (the first riveting portion 543) that fixes the flange part 30b and the second holding section (the second riveting portion 553) that fixes the sensor board 33 are arranged so as to shift each other in the circumferential direction (so that the first and second riveting portions 543, 553 do not overlap each other in the radial direction). That is, when viewed in the circumferential direction, the both riveting portions (the first and second riveting portions 543, 553) are arranged so as not to overlap each other. Thus, the setting of the both riveting portions (the first and second riveting portions 543, 553) with one of them significantly protruding in the radially outward direction can be suppressed while preventing the one from interfering with the other. This also brings about the size reduction, in the radial direction, of the system 1.

Further, the second holding section (the second riveting portion 553) that fixes the sensor board 33 is disposed so as to shift in the circumferential direction with respect to the first and second terminal setting parts 305, 306 (the coil terminals 34) of the coil bobbin 30. The connecter terminals 80 that connect the sensor board 33 to the sensor housing 5 are arranged so as to shift in the circumferential direction with respect to the first holding section (the first riveting portion 543). Accordingly, as same as the above, this brings about the size reduction, in the radial direction, of the system 1.

In the present embodiment 1, the second holding section (the second riveting portion 553) and the connecter terminals 80 are arranged at as inward as possible in the radial direction within an area that does not interfere with the coil bobbin 30. More specifically, the second holding section (the second riveting portion 553) and the connecter terminals 80 are arranged at a radial direction position that substantially overlaps a circumference of a circle (a circumscribed circle) which connects outer peripheral edges of the flange part 30b or within this circumference of the circle. As a consequence, it is possible to reduce the size of the sensor board 33 to the substantially same extent as the circumscribed circle of the flange part 30b.

Figure 12:
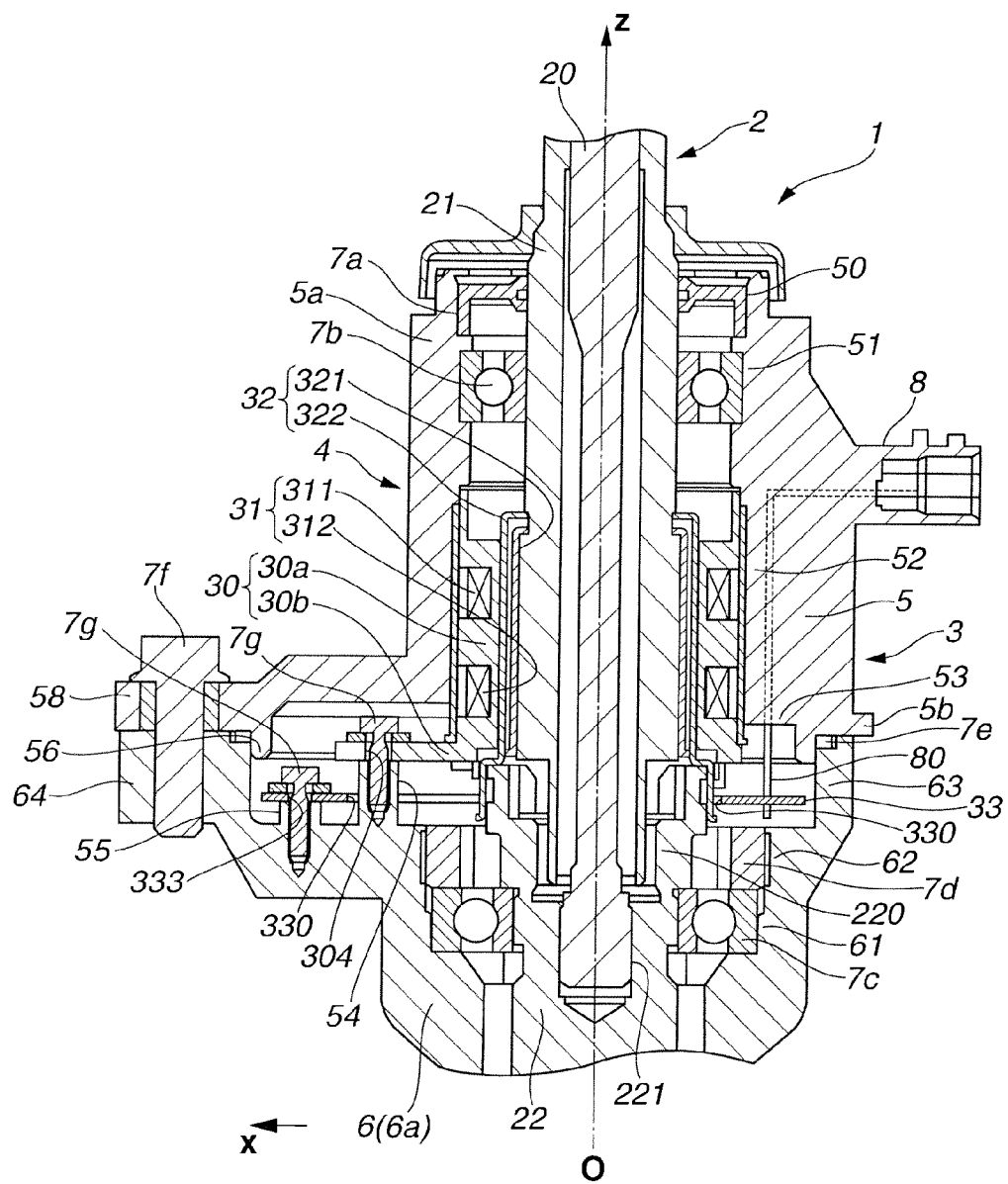
FIG. 12 is a local sectional view of a power steering system, cut in the steering shaft direction, of a comparative example 3.

FIG. 12 shows a cross section of a system 1 of the comparative example 3, longitudinally cut along the center axis O, same as FIG. 1. A structure of the system 1 of the comparative example 3 is basically same as that of the comparative example 1, but uses a bolt 7g or a screw as a holding section for fixing the flange part 30b and the sensor board 33 to the housing 4. Material of the gear housing 6 could be the resin or the metal. As shown by this comparative example 3, the flange part 30b etc. can be fixed to the housing 4 using the bolt or the screw.

In contrast to this, in the embodiment 1, the flange part 30b etc. are fixed by the fact that a holding member (the first and second protrusions 54, 55) made of the resin material is deformed. Since this holding member is formed integrally with the housing 4 (the sensor housing 5), parts count of the system 1 can be reduced, also the structure of the system 1 can be simplified.

Here, in the embodiment 1, by plastic deformation of the holding member (the first and second protrusions 54, 55) made of the resin material, the enlarged portion (the first and second riveting portions 543, 553) is formed, then the flange part 30b etc. are fixed by the riveting. However, the flange part 30b etc. could be fixed to the housing 4 by elastic deformation of the resin-made holding member (e.g. using snap-fit).

In the present embodiment 1, in order to provide the held section with which the holding member (the first and second protrusions 54, 55) engages at the flange part 30b and the sensor board 33, the penetration holes 304, 333 (that penetrate the flange part 30b etc. in the Z-axis direction) are formed. The flange part 30b etc. are held by (fixed to) the sensor housing 5 by the fact that the holding member (the first and second protrusions 54, 55) is inserted into these axial direction penetration holes 304, 333. Thus, as compared with a case where there is no axial direction penetration holes 304, 333 but, for example, a holding member of the sensor housing 5 side engages with the outer peripheral edge of the flange part 30b and the inner and outer peripheral edges of the sensor board 33, the increase in size in the radially outward direction of the flange part 30b and the sensor board 33 can be suppressed.

Additionally, since the held section is formed by the axial direction penetration hole 304 then the flange part 30b etc. are fixed by the riveting, it is possible to fix the flange part 30b etc. to the housing 4 (the sensor housing 5) surely and accurately. For instance, with regard to the first riveting portion 543, the protruding part of the holding member (the inserting portion 541 of the first protrusion 54), which penetrates and protrudes from the axial direction penetration hole 304 of the flange part 30b, is melted and deformed so that the size of the protruding part becomes greater than the inside diameter of the axial direction penetration hole 304, thereby forming the first riveting portion 543. It is therefore possible to fix the flange part 30b to the housing 4 (the sensor housing 5) surely in the Z-axis direction.

In addition, the first riveting portion 543 is formed by melting and deforming the holding member (the first protrusion 54) with the first protrusion 54 penetrating the axial direction penetration hole 304 of the flange part 30b. Because of this, when forming the first riveting portion 543, it is possible to prevent a relative position between the flange part 30b and the housing 4 (the sensor housing 5) from shifting. A positioning accuracy (in the radial direction) of the coil bobbin 30 (the sensor coil 31) can therefore be increased.

With regard to the second riveting portion 553, the same effect or advantage can be gained.

Regarding the holding member (the first protrusion 54), the boss portion 540 is provided between the housing 4 (the sensor housing 5) located at a root side of the first protrusion 54 and the inserting portion 541 located at a top end side of the first protrusion 54. Thus, as compared with a case where there is no boss portion, a distance from the melted top end of the inserting portion 541 and the housing 4 (the sensor housing 5) becomes long. As a result, the effect of heat on the housing 4 (the sensor housing 5) upon the melt of the inserting portion 541 can be suppressed. Hence, deformation of the housing 4 (the sensor housing 5) caused by the heat is suppressed, and accuracy in assembly of each part or component of the housing 4 (the sensor housing 5) and a sealing performance of the housing 4 can be increased.

With regard to the second riveting portion 553, the same effect or advantage can be gained.

Regarding the holding member (the first protrusion 54), the stepped portion 542 is provided between the boss portion 540 and the inserting portion 541. The first riveting portion 543 is then formed with the flange part 30b touching or being contiguous with the stepped portion 542 (the Z-axis negative direction end surface of the boss portion 540). Therefore, since positioning of the flange part 30b in the Z-axis direction with respect to the housing 4 (the sensor housing 5) is made when and after forming the first riveting portion 543 (melt and deformation of the inserting portion 541), it is possible to prevent a relative position (in the Z-axis direction) between the coil bobbin 30 (the sensor coil 31) and the housing 4 (the sensor housing 5) from shifting. The detection accuracy of the torque sensor 3 can be consequently improved, also variations in sensor characteristics can be suppressed.

With regard to the second riveting portion 553, the same effect or advantage can be gained.

The first riveting portion 543 is provided so as to be positioned at the other unit (the gear housing 6) side of the housing 4 (i.e. at the Z-axis negative direction side) with respect to the axial direction end portion (the Z-axis negative direction end of the protruding portion 56) of the one unit (the sensor housing 5) of the housing 4 to which the flange part 30b is fixed. Thus, when forming the first riveting portion 543, the one unit (the sensor housing 5) is prevented from interfering with the first riveting portion 543, namely that the one unit (the sensor housing 5) does not interfere with this forming work. This increases efficiency in the riveting work. Further, this makes it easier to fit the flange part 30b between the first riveting portion 543 and the boss portion 540 by pressing the first riveting portion 543 against the flange part 30b. Therefore, backlash (rattle or play) between the flange part 30b and the boss portion 540 can be suppressed, and it is possible to easily suppress the shift of the relative position (in the Z-axis direction) between the coil bobbin 30 (the sensor coil 31) and the one unit (the sensor housing 5).

As for the second riveting portion 553, the sensor board 33 is fixed through the second riveting portion 553 so as to be positioned at the other unit (the gear housing 6) side of the housing 4 (i.e. at the Z-axis negative direction side) with respect to the axial direction end portion (the Z-axis negative direction end of the protruding portion 56) of the one unit (the sensor housing 5) of the housing 4 to which the sensor board 33 is fixed. Thus, when performing the riveting of the second riveting portion 553, the one unit (the sensor housing 5) is prevented from interfering with the sensor board 33, thereby increasing the efficiency in the work.

Furthermore, in the method for assembling the system 1 of the embodiment 1, the board setting (or installing) process takes place after the first riveting process. Thus, in the first riveting process, the sensor board 33 does not interfere with the riveting work. The assembly is facilitated, and productivity of the system 1 can be increased.

Effects of Embodiment 1

From the foregoing, the embodiment 1 includes the following structure or configuration of the power steering system, and has the following effects.

(A1) A power steering system comprises: a housing (4) having a first housing section (a sensor housing 5) which is formed by resin material and has a coil housing portion (52) thereinside and an opening portion at an axial direction side thereof (Z-axis negative direction side) and a second housing section (a gear housing 6) which closes the opening portion of the first housing section (5) by being combined with the first housing section (5); a steering shaft (2) having an input shaft (21) to which a turning force from a steering wheel is transmitted and an output shaft (22) which is connected to the input shaft (21) through a torsion bar (20) and transmits the turning force to steered road wheels, the steering shaft (2) rotatably housed in the housing (4); a sensor coil (31) housed in the coil housing portion (52) and positioned at an outer periphery of the steering shaft (2), the sensor coil (31) outputting a relative rotation amount between the input shaft (21) and the output shaft (22) as an impedance change by application of an excitation signal; a coil bobbin (30) having a coil holding part (30a) which holds the sensor coil (31) and a flange part (30b) which is provided so as to protrude from the coil holding part (30a) in a radially outward direction, the coil bobbin (30) formed by the resin material and housed in the coil housing portion (52); a first held section (304 and its surrounding part) provided at the flange part (30b) of the coil bobbin (30); a sensor board (33) housed in the housing (4) and electrically connected to the sensor coil (31), an electronic element that outputs the excitation signal to the sensor coil (31) being mounted on the sensor board (33); a second held section (333 and its surrounding part) provided at the sensor board (33); a first riveting portion (543) formed by the resin material and provided at the first housing section (5), the first riveting portion (543) fixing the coil bobbin (30) to the first housing section (5) by the fact that a first holding section (an enlarged portion) that engages with and holds the first held section (an axial direction penetration hole 304 and its surrounding part) is formed at the first riveting portion (543) in a molten state; a second riveting portion (553) formed by the resin material and provided at the first housing section (5), the second riveting portion (553) fixing the sensor board (33) to the first housing section (5) by the fact that a second holding section (an enlarged portion) that engages with and holds the second held section (an axial direction penetration hole 333 and its surrounding part) is formed at the second riveting portion (553) in the molten state; and an electric motor driven and controlled according to an output signal of the sensor coil (31) and providing a steering assist force to the steered road wheels, and one (33) of the flange part (30b) of the coil bobbin (30) and the sensor board (33) is located at a second housing section (6) side with respect to the other (30b) in an axial direction (Z-axis direction) of the steering shaft (2), and one (543) of the first and second riveting portions (543, 553), which is provided at the other (30b) of the flange part (30b) and the sensor board (33), is disposed so as to overlap the one (33) of the flange part (30b) and the sensor board (33) in a direction orthogonal to the steering shaft (2).

Since the flange part 30b of the coil bobbin 30 and the sensor board 33 are arranged in series in the axial direction, the size reduction, in the radial direction, of the system 1 can be achieved. Accordingly, the vehicle-mount layout of the system 1 can be improved.

Further, since the one (the first riveting portion 543) of the first and second riveting portions 543, 553, which is provided at the other (flange part 30b) of the flange part 30b and the sensor board 33, is disposed so as to overlap the one (the sensor board 33) of the flange part 30b and the sensor board 33, the size of the system 1 can be further reduced.

(A2) In the power steering system, the sensor board (33) is located at the second housing section (the gear housing 6) side (the Z-axis negative direction side) with respect to the flange part (30b) of the coil bobbin (30) in the axial direction (the Z-axis direction) of the steering shaft (2).

Since the sensor board 33 on which a number of the electronic elements are soldered is located at the second housing section (the gear housing 6) side, in the inspection to check the solder bonding state of the sensor board 33, it is possible to prevent the flange part 30b from interfering with the inspection. This increases efficiency in the inspection.

In addition, since the electronic elements can be mounted also in the area on the sensor board 33 where the first riveting portion 543 overlaps the flange part 30b, the size of the system 1 can be further reduced.

(A3) In the power steering system, the first held section is an axial direction penetration hole (304 and its surrounding part) that is formed at the flange part (30b) of the coil bobbin (30), and the first riveting portion (543) is formed by the fact that (i) the first riveting portion (543) is inserted into the axial direction penetration hole (304) of the coil bobbin (30) from a first housing section (5) side toward the second housing section (6) side (toward the Z-axis negative direction), (ii) a part of the first riveting portion (543), which penetrates and protrudes from the axial direction penetration hole (304) of the coil bobbin (30) to the second housing section (6) side (to the Z-axis negative direction side), is melted, and (iii) the protruding part of the first riveting portion (543) is deformed so that a radial direction size of the protruding part becomes greater than an inside diameter of the axial direction penetration hole (304) of the coil bobbin (30).

By melting and forming the first riveting portion 543 so that the radial direction size of the protruding part of the first riveting portion 543, which protrudes from the axial direction penetration hole 304, becomes greater than the inside diameter of the axial direction penetration hole 304, it is possible to surely fix the flange part 30b of the coil bobbin 30.

Further, since the first riveting portion 543 is melted and formed with the first riveting portion 543 penetrating the axial direction penetration hole 304 of the coil bobbin 30, it is possible to prevent the relative position between the flange part 30b and the first riveting portion 543 from shifting, when melting and forming the first riveting portion 543.

(A4) In the power steering system, the first riveting portion (543) has a boss portion (540) that extends from the first housing section (5) to the second housing section (6) side and an inserting portion (541) that protrudes from an end portion, at the second housing section (6) side, of the boss portion (540) and is inserted into the axial direction penetration hole (304) of the coil bobbin (30).

By providing the boss portion 540 between the first housing section 5 and the inserting portion 541, since the distance from the melted top end of the inserting portion 541 and the first housing section 5, the effect of heat on the first housing section 5 side upon the melt of the inserting portion 541 can be suppressed.

(A5) In the power steering system, the boss portion (540) is formed so as to have a greater diameter than the inside diameter of the axial direction penetration hole (304) of the coil bobbin (30), the inserting portion (541) is formed so as to have a smaller diameter than the inside diameter of the axial direction penetration hole (304) of the coil bobbin (30), and the first riveting portion (543) is formed by the fact that (i) the inserting portion (541) is inserted into the axial direction penetration hole (304) of the coil bobbin (30), and (ii) the protruding part of the inserting portion (541) is melted and deformed with a stepped portion (542) that is formed between the boss portion (540) and the inserting portion (541) being contiguous with the flange part (30b) of the coil bobbin (30).

By forming the first riveting portion 543 with the flange part 30b of the coil bobbin 30 being contiguous with the stepped portion 542, it is possible to prevent the relative position between the flange part 30b and the first riveting portion 543 from shifting, when and after forming the first riveting portion 543.

(A6) In the power steering system, the sensor board (33) is fixed by the second riveting portion (553) so as to be positioned at the second housing section (6) side with respect to an end (Z-axis negative direction end of the protruding portion 56), at the second housing section (6) side (the Z-axis negative direction side), of the first housing section (5).

Since the first housing section 5 is prevented from interfering with the sensor board 33, this increases efficiency in at least one of the riveting process, the soldering process of the electronic elements mounted on the sensor board 33 and the inspection process for checking the solder bonding state.

(A7) In the power steering system, the first riveting portion (543) is provided so as to be positioned at the second housing section (6) side with respect to the end (Z-axis negative direction end of the protruding portion 56), at the second housing section (6) side, of the first housing section (5).

Since the first housing section 5 is prevented from interfering with the first riveting portion 543, this increases efficiency in the riveting process of the first riveting portion 543.

(A8) In the power steering system, the second held section is an axial direction penetration hole (333) that is formed at the sensor board (33), and the second riveting portion (553) is formed by the fact that (i) the second riveting portion (553) is inserted into the axial direction penetration hole (333) of the sensor board (33) from a first housing section (5) side toward the second housing section (6) side, (ii) a part of the second riveting portion (553), which penetrates and protrudes from the axial direction penetration hole (333) of the sensor board (33) to the second housing section (6) side, is melted, and (iii) the protruding part of the second riveting portion (553) is deformed so that a radial direction size of the protruding part becomes greater than an inside diameter of the axial direction penetration hole (333) of the sensor board (33).

By melting and forming the second riveting portion 553 so that the radial direction size of the protruding part of the second riveting portion 553, which protrudes from the axial direction penetration hole 333, becomes greater than the inside diameter of the axial direction penetration hole 333, it is possible to surely fix the sensor board 33.

Further, since the second riveting portion 553 is melted and formed with the second riveting portion 553 penetrating the axial direction penetration hole 333 of the sensor board 33, it is possible to prevent the relative position between the sensor board 33 and the second riveting portion 553 from shifting, when melting and forming the second riveting portion 553.

(B1) A method for assembling a power steering system, the power steering system having a housing (4) having a first housing section (5) which is formed by resin material and has a coil housing portion (52) thereinside and an opening portion at an axial direction side thereof and a second housing section (6) which closes the opening portion of the first housing section (5) by being combined with the first housing section (5); a steering shaft (2) having an input shaft (21) to which a turning force from a steering wheel is transmitted and an output shaft (22) which is connected to the input shaft (21) through a torsion bar (20) and transmits the turning force to steered road wheels, the steering shaft (2) rotatably housed in the housing (4); a sensor coil (31) housed in the coil housing portion (52) and positioned at an outer periphery of the steering shaft (2), the sensor coil (31) outputting a relative rotation amount between the input shaft (21) and the output shaft (22) as an impedance change by application of an excitation signal; a coil bobbin (30) having a coil holding part (30a) which holds the sensor coil (31) and a flange part (30b) which is provided so as to protrude from the coil holding part (30a) in a radially outward direction, the coil bobbin (30) formed by the resin material and housed in the coil housing portion (52); first and second riveting portions (543,553) formed by the resin material and provided at the first housing section (5); a first held section (304 and its surrounding part) provided at the flange part (30b) of the coil bobbin (30); a sensor board (33) housed in the housing (4) and electrically connected to the sensor coil (31), an electronic element that outputs the excitation signal to the sensor coil (31) being mounted on the sensor board (33); a second held section (333 and its surrounding part) provided at the sensor board (33); and an electric motor driven and controlled according to an output signal of the sensor coil (31) and providing a steering assist force to the steered road wheels, the method comprises: a bobbin inserting process that inserts the coil bobbin (30) in the coil housing portion (52); a first riveting process that fixes the coil bobbin (30) to the first housing section (5) by deforming the first riveting portion (543) after melting the first riveting portion (543) with the first held section (304 and its surrounding part) being contiguous with the first riveting portion (543); a board setting process that sets the sensor board (33) at a second housing section (6) side with respect to the flange part (30b) so that the second held section (333 and its surrounding part) is contiguous with the second riveting portion (553), after the first riveting process; and a second riveting process that fixes the sensor board (33) to the first housing section (5) by deforming the second riveting portion (553) after melting the second riveting portion (553) with the second held section (333 and its surrounding part) being contiguous with the second riveting portion (553).

Since the flange part 30b of the coil bobbin 30 and the sensor board 33 are arranged in series in the axial direction, the size reduction, in the radial direction, of the system 1 can be achieved.

Further, by setting the sensor board 33 after the first riveting process, it is possible to avoid the interference of the sensor board 33 in the riveting process, then the efficiency in the riveting process can be increased.

(B2) In the method for assembling the power steering system, the first riveting portion (543) is set so as to overlap the sensor board (33) in a direction orthogonal to the steering shaft (2).

Since the electronic elements can be mounted also in the area on the sensor board 33 where the first riveting portion 543 overlaps the coil bobbin 30, the size of the system 1 can be further reduced.

(B3) In the method for assembling the power steering system, the electronic element mounted on the sensor board (33) is bonded by a reflow-soldering. Since the sensor board 33 is located at the second housing section (the gear housing 6) side (the Z-axis negative direction side) with respect to the flange part 30b of the coil bobbin 30, it is possible to avoid the interference of the flange part 30b of the coil bobbin 30 in the reflow-soldering process such that the efficiency in the reflow-soldering process can be increased.

Embodiment 2

Figure 6A:
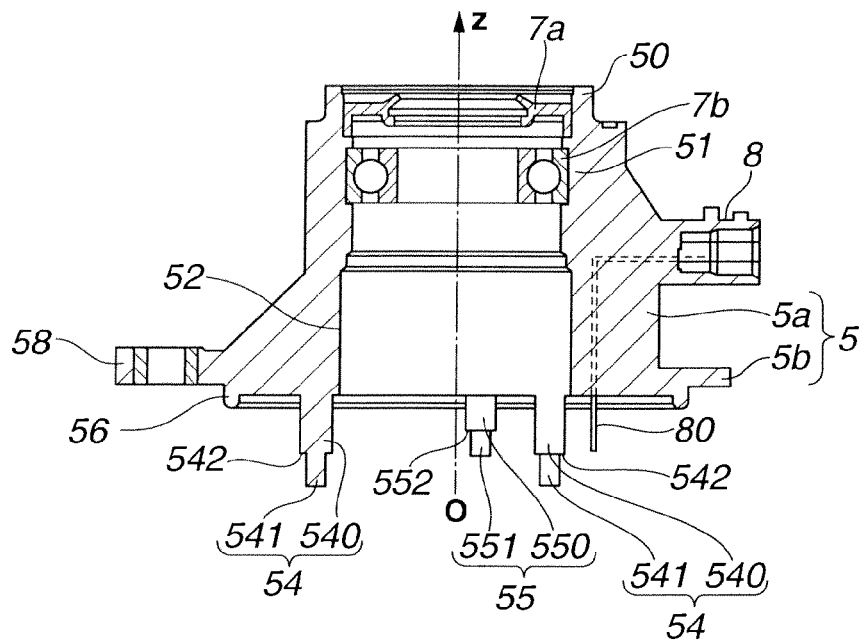
FIG. 6A is a sectional view of a sensor housing, cut in the steering shaft direction, of an embodiment 2 of the present invention.
Figure 6B:
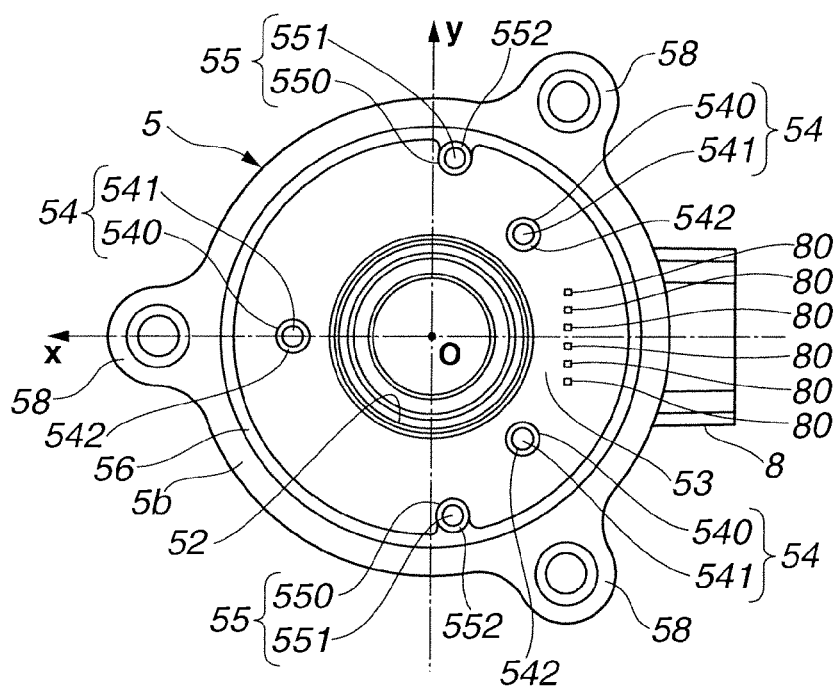
FIG. 6B is a bottom view of the sensor housing, viewed from the steering shaft direction.

In a system 1 of an embodiment 2, the flange part 30b of the coil bobbin 30 is located at the gear housing 6 side (i.e. at the Z-axis negative direction side) with respect to the sensor board 33. FIGS. 6A and 6B are a sectional view of the sensor housing 5, cut along the axial direction, and a bottom view.

FIGS. 6A and 6B to 8A and 8B show each state of assembly of the unit of the sensor housing 5 side that forms the housing 4.

Figure 7A:
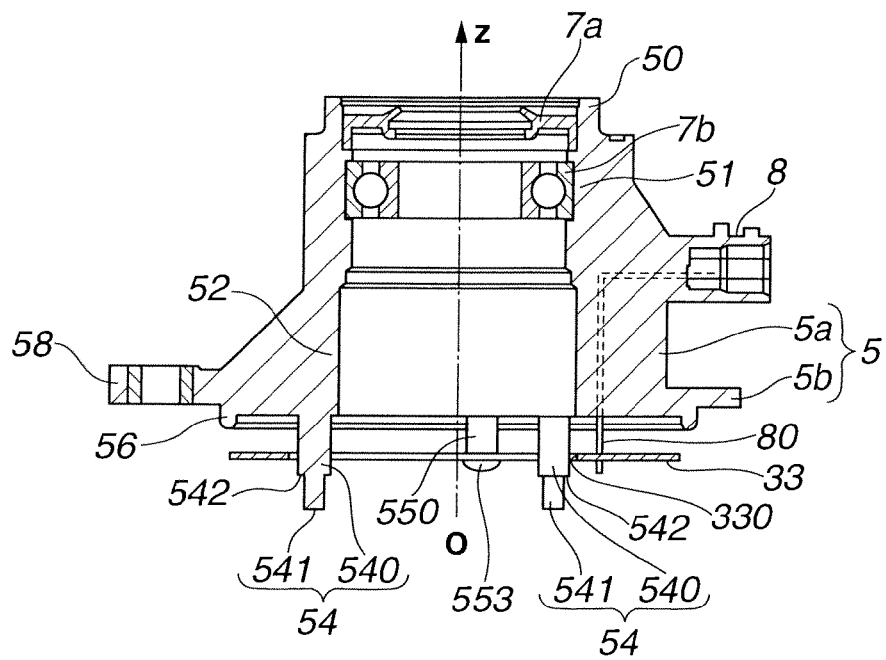
FIG. 7A is a sectional view of the sensor housing with a sensor board set and fixed to the sensor housing, cut in the steering shaft direction, of the embodiment 2.
Figure 7B:
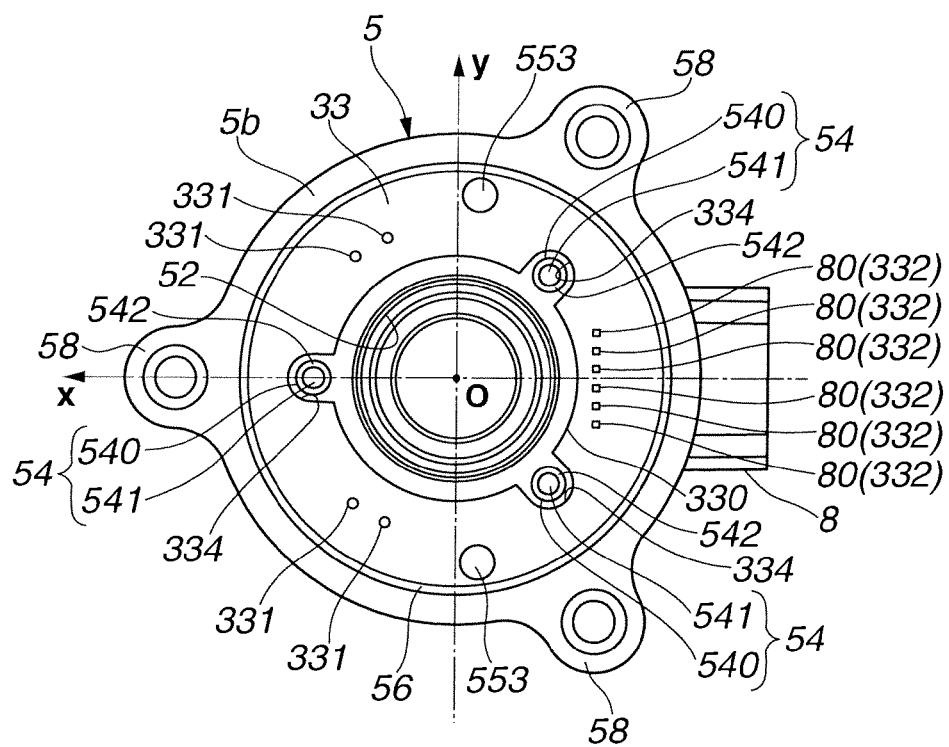
FIG. 7B is a bottom view of the sensor housing and the sensor board, viewed from the steering shaft direction.
Figure 8A:
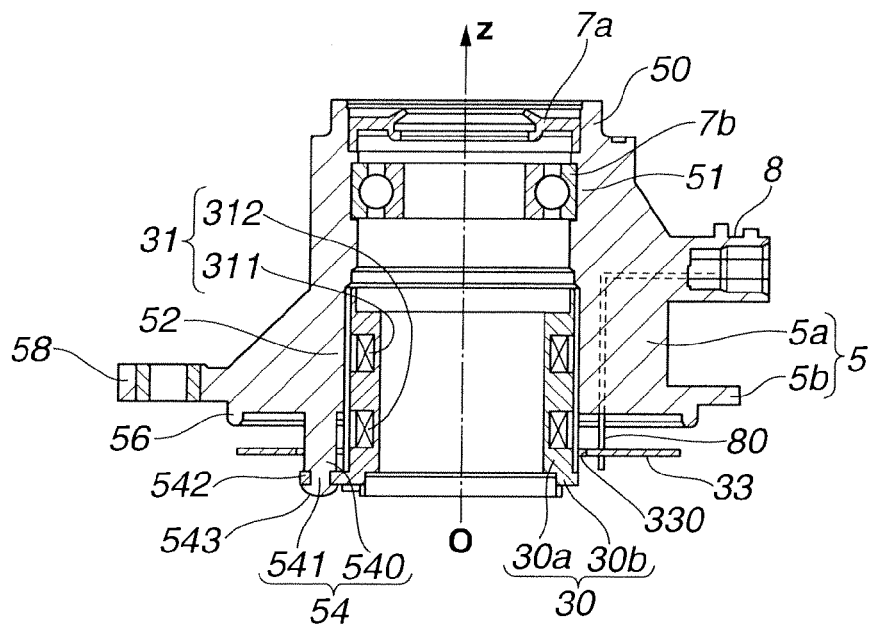
FIG. 8A is a sectional view of the sensor housing with the sensor board set and fixed to the sensor housing and with a coil bobbin installed and fixed in the sensor housing, cut in the steering shaft direction, of the embodiment 2.
Figure 8B:
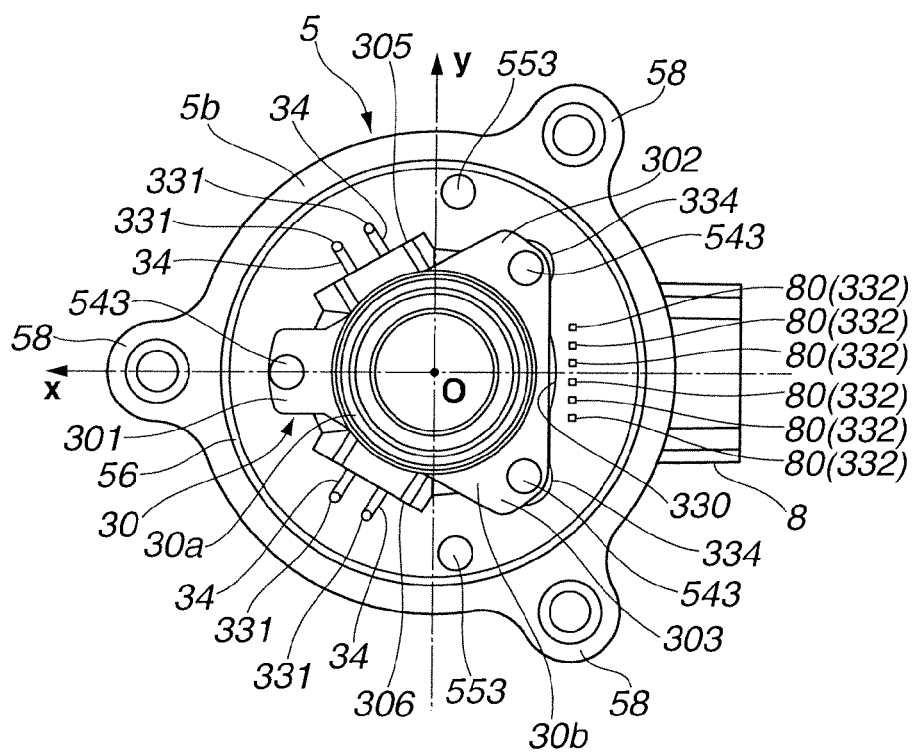
FIG. 8B is a bottom view of the sensor housing, the sensor board and the coil bobbin, viewed from the steering shaft direction.

FIGS. 6A and 6B show a state in which the ball bearing 7b, the seal member 7a, etc. are installed in the sensor housing 5. FIGS. 7A and 7B show a state in which the sensor board 33 is further set. FIGS. 8A and 8B show a state in which the coil bobbin 30 is further set.

Here, FIGS. 6A, 7A and 8A are cross sections of the unit, longitudinally cut as same as FIG. 1. FIGS. 6B, 7B and 8B are bottom views of the unit, viewed from the Z-axis negative direction.

As can be seen in FIG. 7B, cutting portions 334 are formed at three positions at the inner circumferential side of the sensor board 33 so as to integrally connect to the penetration hole 330 of the sensor board 33. Each of the cutting portions 334 is provided at a position corresponding to the first protrusion 54 of the coil bobbin 30 when viewed from the Z-axis direction. As shown in FIGS. 6A to 7B, the first protrusion 54 is set to be higher (longer) (in the Z-axis negative direction) than the second protrusion 55. Further, the first protrusion 54 penetrates the cutting portion 334 of the sensor board 33 in the Z-axis direction, and is inserted into the axial direction penetration hole 304 (as the first held section) of the flange part 30b.

As shown in FIG. 8A, the flange part 30b is located at the gear housing 6 side (i.e. at the Z-axis negative direction side) with respect to the sensor board 33. The first riveting portion 543 is formed at the Z-axis negative direction side with respect to the second riveting portion 553.

As shown in FIG. 8B, the coil terminals 34 protrude from the respective terminal setting parts 305, 306 in the Z-axis positive direction and in the radially outward direction, and are connected to the sensor board 33.

A method for assembling the system 1 in the embodiment 2 has a board setting (or installing) process (FIGS. 6A, 6B→FIGS. 7A, 7B), a second riveting (or fixing) process (FIGS. 7A, 7B), a bobbin inserting process (FIGS. 7A, 7B→FIGS. 8A, 8B) and a first riveting (or fixing) process (FIGS. 8A, 8B). These processes take place in this order, the power steering system 1 is then assembled. The other configuration or structure is the same as the embodiment 1, thus the same components as the embodiment 1 are denoted by the same reference numbers, and an explanation of these components is omitted.

Structural Advantage of Embodiment 2

Next, structural advantages of the system 1 of the embodiment 2 will be explained. Both the flange part 30b and the sensor board 33 are fixed to the one unit (the sensor housing 5) of the housing 4, and the sensor board 33 is located at the one unit (the sensor housing 5) side (i.e. at the Z-axis positive direction side), and the flange part 30b is located at the other unit (the gear housing 6) side (i.e. at the Z-axis negative direction side). Thus, in the riveting work of the first riveting portion 543, the sensor board 33 does not interfere with this riveting work, thereby increasing the efficiency in the work.

In addition, the first riveting portion 543 is provided so as to be positioned at the other unit (the gear housing 6) side (i.e. at the Z-axis negative direction side) with respect to the axial direction end portion (the Z-axis negative direction end of the protruding portion 56) of the one unit (the sensor housing 5) to which the flange part 30b is fixed. Therefore, this increases the efficiency in the riveting work of the first riveting portion 543.

The cutting portion 334 is provided at the inner circumferential side of the sensor board 33, and the first protrusion 54 penetrates this cutting portion 334 in the Z-axis direction and is inserted into the axial direction penetration hole 304 of the flange part 30b. This makes the positioning of the coil bobbin 30 stable. Although the cutting portion 334 which the first protrusion 54 penetrates could be provided at the outer circumferential side of the sensor board 33, in this case, the size, in the radial direction, of the flange part 30b might increase.

In contrast to this, in the embodiment 2, since the cutting portions 334 is provided at the inner circumferential side of the sensor board 33, the increase in size in the radial direction of the flange part 30b can be suppressed. Consequently, size reduction of the coil bobbin 30 and the stable positioning of the coil bobbin 30 with respect to the housing 4 (the sensor housing 5) can be achieved.

Additionally, the embodiment 2 can gain the same effects or advantages as the embodiment 1 by the structure or configuration corresponding to the embodiment 1.

Effects of Embodiment 2

From the foregoing, the embodiment 2 includes the following structure or configuration of the power steering system, and has the following effects.

(C1) In the power steering system, the flange part (30b) of the coil bobbin (30) is located at the second housing section (6) side (at the Z-axis negative direction side) with respect to the sensor board (33) in the axial direction (the Z-axis direction) of the steering shaft (2).

Since it is possible to prevent the sensor board 33 from interfering with the riveting process of the first riveting portion 543, this increases efficiency in the riveting process.

(C2) In the power steering system, the first held section is an axial direction penetration hole (304 and its surrounding part) that is formed at the flange part (30b) of the coil bobbin (30), and the first riveting portion (543) is formed by the fact that (i) the first riveting portion (543) is inserted into the axial direction penetration hole (304) of the coil bobbin (30) from a first housing section (5) side toward the second housing section (6) side, (ii) a part of the first riveting portion (543), which penetrates and protrudes from the axial direction penetration hole (304) of the coil bobbin (30) to the second housing section (6) side, is melted, and (iii) the protruding part of the first riveting portion (543) is deformed so that a radial direction size of the protruding part becomes greater than an inside diameter of the axial direction penetration hole (304) of the coil bobbin (30).

By melting and forming the first riveting portion 543 so that the radial direction size of the protruding part of the first riveting portion 543, which protrudes from the axial direction penetration hole 304, becomes greater than the inside diameter of the axial direction penetration hole 304, it is possible to surely fix the flange part 30b of the coil bobbin 30.

Further, since the first riveting portion 543 is melted and formed with the first riveting portion 543 penetrating the axial direction penetration hole 304 of the coil bobbin 30, it is possible to prevent the relative position between the flange part 30b and the first riveting portion 543 from shifting, when melting and forming the first riveting portion 543.

(C3) In the power steering system, the first riveting portion (543) has: a boss portion (540) that extends from the first housing section (5) to the second housing section (6) side; and an inserting portion (541) that protrudes from an end portion, at the second housing section (6) side, of the boss portion (540) and is inserted into an axial direction penetration hole (333 that is formed at the sensor board.

By providing the boss portion 540 between the first housing section 5 and the inserting portion 541, since the distance from the melted top end of the inserting portion 541 and the first housing section 5, the effect of heat on the first housing section 5 side upon the melt of the inserting portion 541 can be suppressed.

(C4) In the power steering system, the first riveting portion (543) is provided so as to be positioned at the second housing section (6) side with respect to an end (Z-axis negative direction end of the protruding portion 56), at the second housing section (6) side, of the first housing section (5).

Since the first housing section 5 is prevented from interfering with the first riveting portion 543, this increases efficiency in the riveting process of the first riveting portion 543.

(C5) In the power steering system, the sensor board (33) is fixed by the second riveting portion (553) so as to be positioned at the second housing section (6) side with respect to the end (Z-axis negative direction end of the protruding portion 56), at the second housing section (6) side, of the first housing section (5).

Since the first housing section 5 is prevented from interfering with the sensor board 33, this increases efficiency in at least one of the riveting process, the soldering process of the electronic elements mounted on the sensor board 33 and the inspection process for checking the solder bonding state.

(C6) In the power steering system, the second held section is an axial direction penetration hole (333) that is formed at the sensor board (33), and the second riveting portion (553) is formed by the fact that (i) the second riveting portion (553) is inserted into the axial direction penetration hole (333) of the sensor board (33) from a first housing section (5) side toward the second housing section (6) side, (ii) a part of the second riveting portion (553), which penetrates and protrudes from the axial direction penetration hole (333) of the sensor board (33) to the second housing section (6) side, is melted, and (iii) the protruding part of the second riveting portion (553) is deformed so that a radial direction size of the protruding part becomes greater than an inside diameter of the axial direction penetration hole (333) of the sensor board (33).

By melting and forming the second riveting portion 553 so that the radial direction size of the protruding part of the second riveting portion 553, which protrudes from the axial direction penetration hole 333, becomes greater than the inside diameter of the axial direction penetration hole 333, it is possible to surely fix the sensor board 33.

Further, since the second riveting portion 553 is melted and formed with the second riveting portion 553 penetrating the axial direction penetration hole 333 of the sensor board 33, it is possible to prevent the relative position between the sensor board 33 and the second riveting portion 553 from shifting, when melting and forming the second riveting portion 553.

Embodiment 3

In a system 1 of an embodiment 3, a large diameter part 35 is provided at the penetration hole (the bobbin penetration hole) 330 of the sensor board 33 so that the flange part 30b of the coil bobbin 30 and the first and second terminal setting parts 305, 306 can be inserted into the penetration hole 330.

Figure 9:
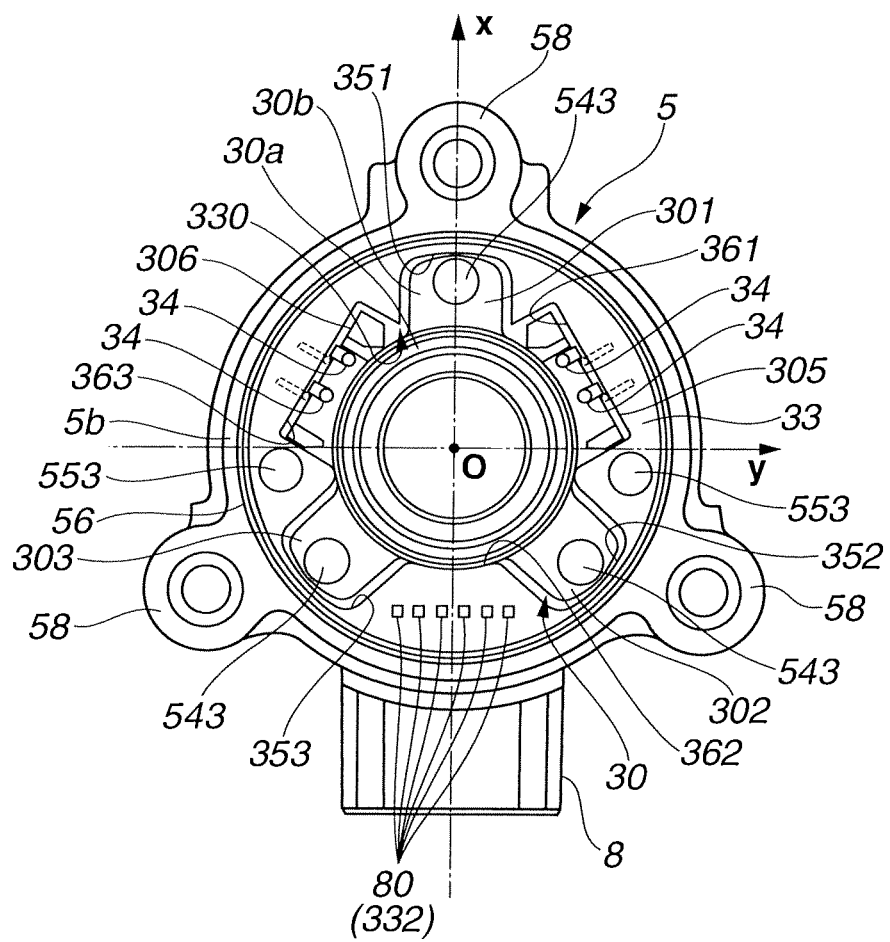
FIG. 9 is a bottom view of a power steering system, when viewing a unit of a sensor housing side from the steering shaft direction, of an embodiment 3 of the present invention.

FIG. 9 is a bottom view of a completed unit of the sensor housing 5 side of the embodiment 3, when viewed from the Z-axis negative direction. As shown in FIG. 9, when viewed from the Z-axis direction, the first to third flange parts 301 to 303 are formed into a substantially rectangular shape that protrudes from the coil holding part 30a in the radially outward direction. More specifically, the first to third flange parts 301 to 303 are arranged around the axis of the coil bobbin 30 (in the axial direction) at a certain distance.

The penetration hole 330 formed at the sensor board 33 is a bobbin penetration hole that is formed so that the coil bobbin 30 (the coil holding part 30a, the first to third flange parts 301 to 303 and the first and second terminal setting parts 305, 306) can be inserted. The penetration hole 330 has the large diameter part 35 and a small diameter part 36.

The large diameter part 35 is provided at three positions in the circumferential direction of the sensor board 33, and has first to third large diameter parts 351 to 353. The first to third large diameter parts 351 to 353 are formed so that the first to third flange parts 301 to 303 can be inserted in the Z-axis direction. More specifically, radial direction distances (radii) from the center O of the sensor board 33 to the first to third large diameter parts 351 to 353 are set to be greater than radial direction distances from the axis of the coil bobbin 30 to the first to third flange parts 301 to 303 respectively. In addition, widths (circumferential direction distances) of the first to third large diameter parts 351 to 353 around the center O of the sensor board 33 are set to be greater than widths (circumferential direction distances) of the first to third flange parts 301 to 303 around the axis of the coil bobbin 30 respectively.

The small diameter part 36 is provided between the adjacent two large diameter parts 35. That is, the small diameter part 36 has a first small diameter part 361 between the first and second large diameter parts 351 and 352, a second small diameter part 362 between the second and third large diameter parts 352 and 353, and a third small diameter part 363 between the third and first large diameter parts 353 and 351.

The first to third small diameter parts 361 to 363 are formed so that the coil holding part 30a (including the first and second terminal setting parts 305, 306) of the coil bobbin 30 can be inserted. The first and third small diameter parts 361, 363 are formed into a substantially rectangular shape that protrudes from the center O of the sensor board 33 in the radially outward direction, while the second small diameter part 362 is formed into a substantially arc shape that extends around the center O of the sensor board 33.

The first to third small diameter parts 361 to 363 are provided so that their edges are positioned at the radially inward direction side with respect to the axial direction penetration holes 304 of the first to third flange parts 301 to 303. The first and third small diameter parts 361, 363 are formed so that the first and second terminal setting parts 305, 306 can be inserted respectively. The second small diameter part 362 is formed so that the coil holding part 30a can be inserted.

The sensor board 33 is located at the gear housing 6 side (i.e. at the Z-axis negative direction side) with respect to the flange part 30b.

Here, by changing a shape of the coil terminals 34 that extend from the terminal setting parts 305, 306 to a hook shape or a shape having inclination with respect to the Z-axis direction as necessary, the work such as the connecting of the coil terminals 34 to the coil terminal connecting portion of the sensor board 33 in the assembly and the soldering of the terminals 34 after the assembly can be facilitated. The other configuration or structure is the same as the embodiment 1, thus the same components as the embodiment 1 are denoted by the same reference numbers, and an explanation of these components is omitted.

Structural Advantage of Embodiment 3

Next, structural advantages of the system 1 of the embodiment 3 will be explained. The large diameter part 35 is provided at the penetration hole 330 of the sensor board 33. The large diameter part 35 is positioned so as to overlap the first holding section (the first riveting portion 543) when viewed from the Z-axis direction. Thus, as the same as the comparative example 2, after the coil bobbin 30 is set at the one unit (the sensor housing 5) and the sensor board 33 is set, it is possible to form the first riveting portion 543 while avoiding the interference of the sensor board 33 and to fix the coil bobbin 30 to the one unit (the sensor housing 5).

Here, as same as the embodiment 2, the sensor board 33 could be located at the one unit (the sensor housing 5) side (i.e. at the Z-axis positive direction side), and the flange part 30b could be located at the other unit (the gear housing 6) side (i.e. at the Z-axis negative direction side). In this case, since the penetration hole 330 of the sensor board 33 is formed so that the coil bobbin 30 can be inserted, the coil bobbin 30 can be installed to the one unit (the sensor housing 5) before setting the sensor board 33. That is, after the coil bobbin 30 is set to the one unit (the sensor housing 5), the flange part 30b and the terminal setting parts 305, 306 of the coil bobbin 30 are inserted into the penetration hole 330. In this way, it is possible for the sensor board 33 to be set at the one unit (the sensor housing 5) side (i.e. at the Z-axis positive direction side) with respect to the flange part 30b.

With regard to the shape of the coil terminals 34, the same effects or advantages can be gained. Additionally, the embodiment 3 has the same effects or advantages as the embodiment 1 by the structure or configuration corresponding to the embodiment 1.

Effects of Embodiment 3

From the foregoing, the embodiment 3 includes the following structure or configuration of the power steering system, and has the following effects.

(D1) A power steering system comprises: a housing (4) having a first housing section (5) which is formed by resin material and has a coil housing portion (52) thereinside and an opening portion at an axial direction side thereof and a second housing section (6) which closes the opening portion of the first housing section (5) by being combined with the first housing section (5); a steering shaft (2) having an input shaft (21) to which a turning force from a steering wheel is transmitted and an output shaft (22) which is connected to the input shaft (21) through a torsion bar (20) and transmits the turning force to steered road wheels, the steering shaft (2) rotatably housed in the housing (4); a sensor coil (31) housed in the coil housing portion (52) and positioned at an outer periphery of the steering shaft (2), the sensor coil (31) outputting a relative rotation amount between the input shaft (21) and the output shaft (22) as an impedance change by application of an excitation signal; a coil bobbin (30) having a coil holding part (30a) which holds the sensor coil (31) and a plurality of flange parts (30b, 301-303) which are arranged at a certain distance in a circumferential direction so as to protrude from the coil holding part (30a) in a radially outward direction, the coil bobbin (30) formed by the resin material and housed in the coil housing portion (52); a first held section (304 and its surrounding part) provided at each of the flange parts (30b, 301-303) of the coil bobbin (30); a sensor board (33) housed in the housing (4) and electrically connected to the sensor coil (31), an electronic element that outputs the excitation signal to the sensor coil (31) being mounted on the sensor board (33); a bobbin penetration hole (330) which is a penetration hole provided at the sensor board (33) and is formed so that the coil holding part (30a) and a plurality of the flange parts (30b, 301-303) of the coil bobbin (30) can be inserted, the bobbin penetration hole (330) having a plurality of large diameter parts (351-353) which are formed so that a plurality of the flange parts (30b, 301-303) of the coil bobbin (30) can be inserted and a small diameter part (36, 361-363) which is provided between the adjacent two large diameter parts (351-353) and is located so that an outer edge of the small diameter part (36, 361-363) is positioned at a radially inward direction side with respect to the first held section (304 and its surrounding part); a second held section (333 and its surrounding part) provided at the sensor board (33); a first riveting portion (543) formed by the resin material and provided at the first housing section (5), the first riveting portion (543) fixing the coil bobbin (30) to the first housing section (5) by the fact that a first holding section (an enlarged portion) that engages with and holds the first held section (304 and its surrounding part) is formed at the first riveting portion (543) in a molten state; a second riveting portion (553) formed by the resin material and provided at the first housing section (5), the second riveting portion (553) fixing the sensor board (33) to the first housing section (5) by the fact that a second holding section (an enlarged portion) that engages with and holds the second held section (333 and its surrounding part) is formed at the second riveting portion (553) in the molten state; and an electric motor driven and controlled according to an output signal of the sensor coil (31) and providing a steering assist force to the steered road wheels.

By providing the large diameter parts 351 to 353 at the sensor board 33, it is possible to prevent the flange part 30b of the coil bobbin 30 from interfering with the sensor board 33. Thus, the sensor board 33 is prevented from interfering with the riveting process of the first riveting portion 543, and this increases efficiency in the riveting process.

In addition, in the case where the sensor board 33 is located at the first housing section 5 side (at the Z-axis positive direction side) with respect to the flange part 30b of the coil bobbin 30, it is possible to install the coil bobbin 30 to the first housing section 5 before setting the sensor board 33.

(D2) In the power steering system, the sensor board (33) is located at the second housing section (6) side with respect to the flange parts (30b, 301-303) of the coil bobbin (30) in the axial direction of the steering shaft (2).

Since the sensor board 33 on which a number of the electronic elements are soldered is located at the second housing section (the gear housing 6) side, in the inspection to check the solder bonding state of the sensor board 33, it is possible to prevent the flange part 30b of the coil bobbin 30 from interfering with the inspection. This increases efficiency in the inspection.

Other Embodiment

Although the power steering system according to the present invention has been explained on the basis of the embodiments 1 to 3, the present invention is not limited to the embodiments 1 to 3. For instance, in the embodiment 1, as the gear mechanism, the rack-and-pinion mechanism is employed. However, the gear mechanism is not limited to the rack-and-pinion mechanism, but could be a ball-and-nut type steering gear. Further, in the embodiment 1, the present invention is applied to the pinion assist type power steering system. However, the present invention can be applied to a rack assist type power steering system. In addition, the embodiment 1 is the electric motor direct-connected power steering system. However, it could be a so-called electro-hydraulic power steering system that generates power of pressure as the steering assist force by driving an oil pump by the electric motor. That is, the power steering system is not limited as long as the power steering system has the electric motor that is controlled (driven) on the basis of the output signal of the sensor coil 31 and provides the steering assist force to the steered road wheels.

Furthermore, the sensor coil 31 is not limited to the torque sensor, but it could be a steering angle sensor, and the power steering system 1 could determine an amount of the steering assist using a detected steering angle. That is, the sensor coil 31 is not limited as long as the sensor outputs the rotation amount of the steering shaft 2 as the impedance change and detects the rotation state of the steering shaft 2.

The entire contents of Japanese Patent Application No. 2011-099637 filed on Apr. 27, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A power steering system comprising:
a housing having:
    a first housing section which is formed by resin material and has a coil housing portion thereinside and an opening portion at an axial direction side thereof; and
    a second housing section which is combined with the first housing section and which closes the opening portion of the first housing section;
a steering shaft having:
    an input shaft to which a turning force from a steering wheel is transmitted; and
    an output shaft which is connected to the input shaft through a torsion bar and transmits the turning force to steered road wheels,
    the steering shaft rotatably housed in the housing;
a sensor coil housed in the coil housing portion and positioned at an outer periphery of the steering shaft, the sensor coil outputting a relative rotation amount between the input shaft and the output shaft as an impedance change by application of an excitation signal;
a coil bobbin having:
    a coil holding part which holds the sensor coil; and a flange part which is provided so as to protrude from the coil holding part in a radially outward direction, the coil bobbin formed by the resin material and housed in the coil housing portion;

a first held section provided at the flange part of the coil bobbin;

a sensor board housed in the housing and electrically connected to the sensor coil, an electronic element that outputs the excitation signal to the sensor coil being mounted on the sensor board;

a second held section provided at the sensor board;

a first riveting portion formed by the resin material and provided at the first housing section, the first riveting portion fixing the coil bobbin to the first housing section by a first structure in which a first holding section that engages with and holds the first held section is formed at the first riveting portion in a molten state;

a second riveting portion formed by the resin material and provided at the first housing section, the second riveting portion fixing the sensor board to the first housing section by a second structure in which a second holding section that engages with and holds the second held section is formed at the second riveting portion in the molten state; and an electric motor driven and controlled according to an output signal of the sensor coil and providing a steering assist force to the steered road wheels, and one of the flange part of the coil bobbin and the sensor board being located at a second housing section side with respect to the other of the flange part of the coil bobbin and the sensor board in an axial direction of the steering shaft, and one of the first and second riveting portions, which is provided at the other of the flange part and the sensor board, being disposed so as to overlap the one of the flange part and the sensor board in a direction orthogonal to the steering shaft.

2. The power steering system as claimed in claim 1, wherein:

the flange part of the coil bobbin is located at the second housing section side with respect to the sensor board in the axial direction of the steering shaft.

3. The power steering system as claimed in claim 2, wherein:

the first riveting portion is positioned at a radially outward side with respect to an outer peripheral edge of the sensor board.

4. The power steering system as claimed in claim 3, wherein:

the first riveting portion has:

a boss portion that extends from the first housing section to the second housing section side; and an inserting portion that protrudes from an end portion, at the second housing section side, of the boss portion and is inserted into an axial direction penetration hole that is formed at the sensor board.

5. The power steering system as claimed in claim 4, wherein:

the first riveting portion is provided so as to be positioned at the second housing section side with respect to an end, at the second housing section side, of the first housing section.

6. The power steering system as claimed in claim 5, wherein:

the sensor board is fixed by the second riveting portion so as to be positioned at the second housing section side with respect to the end, at the second housing section side, of the first housing section.

7. The power steering system as claimed in claim 3, wherein:

the first held section is an axial direction penetration hole that is formed at the flange part of the coil bobbin, and the first riveting portion is formed by a structure in which:

(i) the first riveting portion is inserted into the axial direction penetration hole of the coil bobbin from a first housing section side toward the second housing section side, (ii) a part of the first riveting portion, which penetrates and protrudes from the axial direction penetration hole of the coil bobbin to the second housing section side, is melted, and (iii) the protruding part of the first riveting portion is deformed so that a radial direction size of the protruding part becomes greater than an inside diameter of the axial direction penetration hole of the coil bobbin.

8. The power steering system as claimed in claim 3, wherein:

the second held section is an axial direction penetration hole that is formed at the sensor board, and the second riveting portion is formed by a structure in which:

(i) the second riveting portion is inserted into the axial direction penetration hole of the sensor board from a first housing section side toward the second housing section side, (ii) a part of the second riveting portion, which penetrates and protrudes from the axial direction penetration hole of the sensor board to the second housing section side, is melted, and (iii) the protruding part of the second riveting portion is deformed so that a radial direction size of the protruding part becomes greater than an inside diameter of the axial direction penetration hole of the sensor board.

9. The power steering system as claimed in claim 1, wherein:

the sensor board is located at the second housing section side with respect to the flange part of the coil bobbin in the axial direction of the steering shaft.

10. The power steering system as claimed in claim 9, wherein:

the first held section is an axial direction penetration hole that is formed at the flange part of the coil bobbin, and the first riveting portion is formed by a structure in which:

(i) the first riveting portion is inserted into the axial direction penetration hole of the coil bobbin from a first housing section side toward the second housing section side, (ii) a part of the first riveting portion, which penetrates and protrudes from the axial direction penetration hole of the coil bobbin to the second housing section side, is melted, and (iii) the protruding part of the first riveting portion is deformed so that a radial direction size of the protruding part becomes greater than an inside diameter of the axial direction penetration hole of the coil bobbin.

11. The power steering system as claimed in claim 10, wherein:

the first riveting portion has:

a boss portion that extends from the first housing section to the second housing section side; and an inserting portion that protrudes from an end portion, at the second housing section side, of the boss portion and is inserted into the axial direction penetration hole of the coil bobbin.

12. The power steering system as claimed in claim 11, wherein:
the sensor board is fixed by the second riveting portion so as to be positioned at the second housing section side with respect to an end, at the second housing section side, of the first housing section.

13. The power steering system as claimed in claim 12, wherein:
the first riveting portion is provided so as to be positioned at the second housing section side with respect to the end, at the second housing section side, of the first housing section.

14. The power steering system as claimed in claim 11, wherein:
the boss portion is formed so as to have a greater diameter than the inside diameter of the axial direction penetration hole of the coil bobbin,
the inserting portion is formed so as to have a smaller diameter than the inside diameter of the axial direction penetration hole of the coil bobbin, and
the first riveting portion is formed by a structure in which:
(i) the inserting portion is inserted into the axial direction penetration hole of the coil bobbin, and
(ii) the protruding part of the inserting portion is melted and deformed with a stepped portion that is formed between the boss portion and the inserting portion being contiguous with the flange part of the coil bobbin.

15. The power steering system as claimed in claim 9, wherein:
the second held section is an axial direction penetration hole that is formed at the sensor board, and
the second riveting portion is formed by a structure in which:
(i) the second riveting portion is inserted into the axial direction penetration hole of the sensor board from a first housing section side toward the second housing section side,
(ii) a part of the second riveting portion, which penetrates and protrudes from the axial direction penetration hole of the sensor board to the second housing section side, is melted, and
(iii) the protruding part of the second riveting portion is deformed so that a radial direction size of the protruding part becomes greater than an inside diameter of the axial direction penetration hole of the sensor board.

16. A power steering system comprising:
a housing having:
a first housing section which is formed by resin material and has a coil housing portion thereinside and an opening portion at an axial direction side thereof; and
a second housing section which is combined with the first housing section and which closes the opening portion of the first housing section;
a steering shaft having:
an input shaft to which a turning force from a steering wheel is transmitted; and
an output shaft which is connected to the input shaft through a torsion bar and transmits the turning force to steered road wheels,
the steering shaft rotatably housed in the housing;
a sensor coil housed in the coil housing portion and positioned at an outer periphery of the steering shaft, the sensor coil outputting a relative rotation amount between the input shaft and the output shaft as an impedance change by application of an excitation signal;
a coil bobbin having:
a coil holding part which holds the sensor coil; and
a plurality of flange parts which are arranged at a certain distance in a circumferential direction so as to protrude from the coil holding part in a radially outward direction,
the coil bobbin formed by the resin material and housed in the coil housing portion;
a first held section provided at each of the flange parts of the coil bobbin;
a sensor board housed in the housing and electrically connected to the sensor coil, an electronic element that outputs the excitation signal to the sensor coil being mounted on the sensor board;
a bobbin penetration hole which is a penetration hole provided at the sensor board and is formed so that the coil holding part and a plurality of the flange parts of the coil bobbin can be inserted, the bobbin penetration hole having:
a plurality of large diameter parts which are formed so that a plurality of the flange parts of the coil bobbin can be inserted; and
a small diameter part which is provided between the adjacent two large diameter parts and is located so that an outer edge of the small diameter part is positioned at a radially inward direction side with respect to the first held section;
a second held section provided at the sensor board;
a first riveting portion formed by the resin material and provided at the first housing section, the first riveting portion fixing the coil bobbin to the first housing section by a first structure in which a first holding section that engages with and holds the first held section is formed at the first riveting portion in a molten state;
a second riveting portion formed by the resin material and provided at the first housing section, the second riveting portion fixing the sensor board to the first housing section by a second structure in which a second holding section that engages with and holds the second held section is formed at the second riveting portion in the molten state; and
an electric motor driven and controlled according to an output signal of the sensor coil and providing a steering assist force to the steered road wheels.

17. The power steering system as claimed in claim 16, wherein:
the sensor board is located at the second housing section side with respect to the flange parts of the coil bobbin in the axial direction of the steering shaft.

18. A method for assembling a power steering system, the power steering system having:
a housing having:
a first housing section which is formed by resin material and has a coil housing portion thereinside and an opening portion at an axial direction side thereof; and
a second housing section which is combined with the first housing section and which closes the opening portion of the first housing section;
a steering shaft having:
an input shaft to which a turning force from a steering wheel is transmitted; and
an output shaft which is connected to the input shaft through a torsion bar and transmits the turning force to steered road wheels,
the steering shaft rotatably housed in the housing;

a sensor coil housed in the coil housing portion and positioned at an outer periphery of the steering shaft, the sensor coil outputting a relative rotation amount between the input shaft and the output shaft as an impedance change by application of an excitation signal;
a coil bobbin having:
   a coil holding part which holds the sensor coil; and
   a flange part which is provided so as to protrude from the coil holding part in a radially outward direction,
   the coil bobbin formed by the resin material and housed in the coil housing portion;
first and second riveting portions formed by the resin material and provided at the first housing section;
a first held section provided at the flange part of the coil bobbin;
a sensor board housed in the housing and electrically connected to the sensor coil, an electronic element that outputs the excitation signal to the sensor coil being mounted on the sensor board;
a second held section provided at the sensor board; and
an electric motor driven and controlled according to an output signal of the sensor coil and providing a steering assist force to the steered road wheels,
the method comprising:
   a bobbin inserting process that inserts the coil bobbin in the coil housing portion;
   a first riveting process that fixes the coil bobbin to the first housing section by deforming the first riveting portion after melting the first riveting portion with the first held section being contiguous with the first riveting portion;
   a board setting process that sets the sensor board at a second housing section side with respect to the flange part so that the second held section is contiguous with the second riveting portion, after the first riveting process; and
   a second riveting process that fixes the sensor board to the first housing section by deforming the second riveting portion after melting the second riveting portion with the second held section being contiguous with the second riveting portion.

19. The method for assembling the power steering system as claimed in claim 18, wherein:
the first riveting portion is set so as to overlap the sensor board in a direction orthogonal to the steering shaft.

20. The method for assembling the power steering system as claimed in claim 18, wherein:
the electronic element mounted on the sensor board is bonded by a reflow-soldering.

\* \* \* \* \*